United States Patent
Kondo et al.

(10) Patent No.: US 6,678,330 B1
(45) Date of Patent: Jan. 13, 2004

(54) IMAGE PROCESSING APPARATUS, IMAGE PROCESSING METHOD, DATA-PROCESSING APPARATUS, DATA PROCESSING METHOD, AND STORAGE MEDIUM

(75) Inventors: Tetsujiro Kondo, Tokyo (JP); Kazutaka Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 482 days.

(21) Appl. No.: 09/697,637

(22) Filed: Oct. 26, 2000

(30) Foreign Application Priority Data

Oct. 28, 1999 (JP) .......................................... 11-306648

(51) Int. Cl.[7] ................................................. H04N 7/12
(52) U.S. Cl. ................................................. 375/240.24
(58) Field of Search ................................ 348/452, 533, 348/624, 607, 699; 375/240.01, 240.12–240.16, 240.24, 341; 382/276; 702/189–191, 193–195; 708/300; H04N 7/12

(56) References Cited

U.S. PATENT DOCUMENTS

| | | | | |
|---|---|---|---|---|
| 5,294,979 A | * | 3/1994 | Patel et al. ................. | 348/624 |
| 5,802,220 A | * | 9/1998 | Black et al. ................. | 382/276 |
| 5,920,599 A | * | 7/1999 | Igarashi ...................... | 375/341 |
| 6,034,734 A | * | 3/2000 | De Haan et al. ............ | 348/452 |
| 6,285,710 B1 | * | 9/2001 | Hurst, Jr. et al. ....... | 375/240.12 |
| 6,430,524 B1 | * | 8/2002 | Kondo et al. ............... | 702/191 |

* cited by examiner

Primary Examiner—Richard Lee
(74) Attorney, Agent, or Firm—Frommer Lawrence & Haug LLP; William S. Frommer; Glenn F. Savit

(57) ABSTRACT

An image processing apparatus processes input pixel data and outputs the processed pixel data as output pixel data. The image processing apparatus includes an input-reliability calculation section for calculating an input reliability indicating the reliability of the input pixel data; an output-reliability calculation section for calculating an output reliability indicating the reliability of the output pixel data; a motion-amount detecting section for detecting the motion amount of the input pixel data; a motion-amount-reliability calculation section for calculating a motion-amount reliability indicating the reliability of the motion amount; a compensation section for compensating for the output reliability according to the motion-amount reliability; and a processing section for processing the input pixel data according to the input reliability and the output reliability compensated for, and for outputting the output pixel data. The image processing apparatus effectively reduces noise.

20 Claims, 12 Drawing Sheets

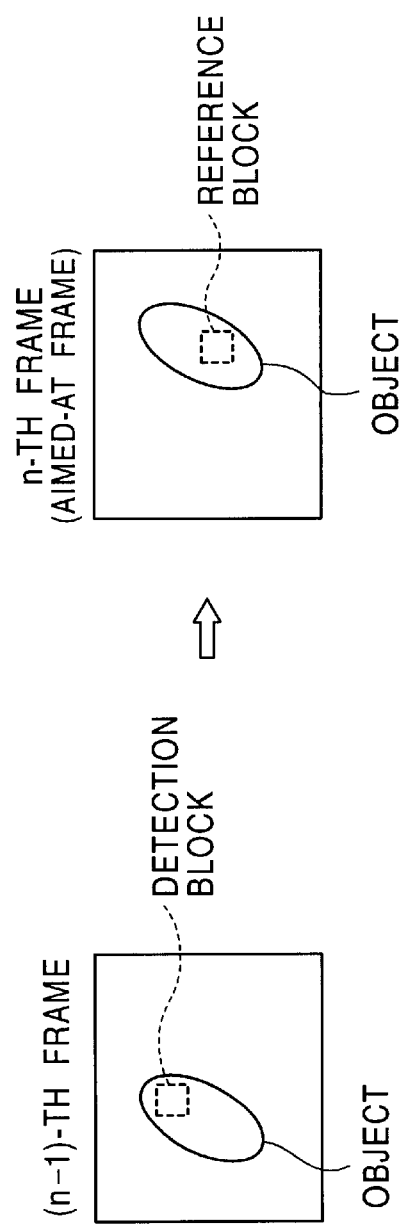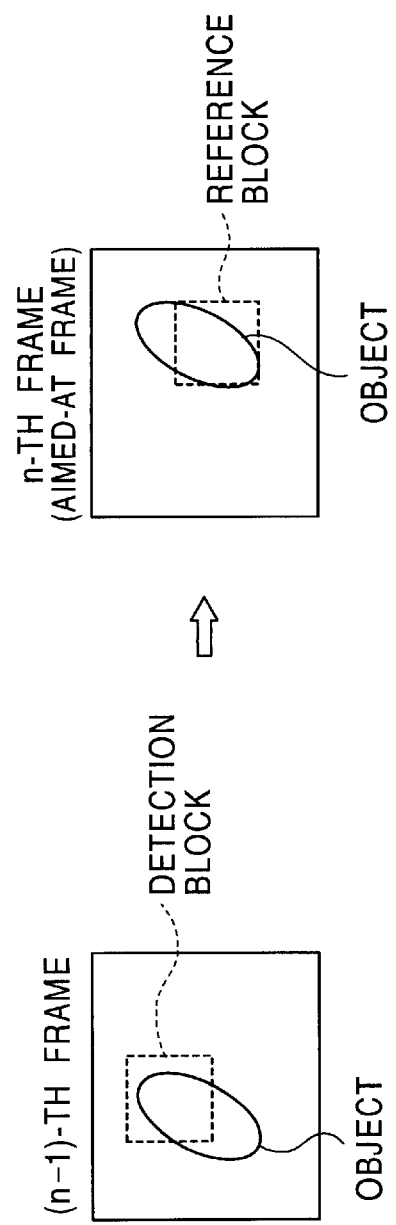
FIG. 5A
FIG. 5B

IMAGE PROCESSING APPARATUS, IMAGE PROCESSING METHOD, DATA-PROCESSING APPARATUS, DATA PROCESSING METHOD, AND STORAGE MEDIUM

BACKGROUND OF THE INVENTION

1. Field of the Invention

The present invention relates to image processing apparatuses, image processing methods, data processing apparatuses, data processing methods, and storage media, and more particularly, to an image processing apparatus, an image processing method, a data processing apparatus, a data processing method, and a storage medium which allow noise included in data, such as a moving image, to be removed more effectively.

2. Description of the Related Art

In general, data such as transmitted or reproduced image data and sound data includes noise which changes as time elapses. To remove the noise included in the data, there have been known methods in which the average, namely, the whole average, of the whole input data is obtained and in which the average of a part of the input data, which is called a moving average, is obtained.

The method in which the whole average is calculated is effective when the degree of noise included in data, namely, the signal-to-noise ratio (s/n ratio) of the data, is uniform. When the s/n ratio of data varies, however, a portion of the data having a low s/n ratio affects a portion of the data having a high s/n ratio to make it difficult to remove the noise effectively in some cases.

In the method in which the moving average is calculated, since the average of data positioned close to the current input data in the time domain is obtained, the processing result is affected by a change in the s/n ratio of the data. In other words, the processing result has a high s/n ratio for a portion of data having a high s/n ratio, but the processing result has a low s/n ratio for a portion of data having a low s/n ratio.

SUMMARY OF THE INVENTION

Accordingly, it is an object of the present invention to solve the foregoing drawbacks.

The foregoing object is achieved in one aspect of the present invention through the provision of an image processing apparatus for processing input pixel data and for outputting the processed input pixel data as output pixel data, including input reliability calculation means for calculating an input reliability indicating the reliability of the input pixel data; output reliability calculation means for calculating an output reliability indicating the reliability of the output pixel data; motion-amount detecting means for detecting the motion amount of the input pixel data; motion-amount-reliability calculation means for calculating a motion-amount reliability indicating the reliability of the motion amount; compensation means for compensating for the output reliability according to the motion-amount reliability; and processing means for processing the input pixel data according to the input reliability and the output reliability compensated for, and for outputting the output pixel data.

The foregoing object is achieved in another aspect of the present invention through the provision of a data processing apparatus for processing input data and for outputting the processed input data as output data, including noise-amount estimate means for estimating the amount of noise included in the input data; input reliability calculation means for calculating an input reliability indicating the reliability of the input data, according to the amount of noise; output reliability calculation means for calculating an output reliability indicating the reliability of the output data; compensation means for compensating for the output reliability according to the amount of noise; and processing means for processing the input data according to the input reliability and the output reliability compensated for, and for outputting the output data.

The foregoing object is achieved in still another aspect of the present invention through the provision of an image processing method for processing input pixel data and for outputting the processed input pixel data as output pixel data, including the steps of calculating an input reliability indicating the reliability of the input pixel data; calculating an output reliability indicating the reliability of the output pixel data; detecting the motion amount of the input pixel data; calculating a motion-amount reliability indicating the reliability of the motion amount; compensating for the output reliability according to the motion-amount reliability; and processing the input pixel data according to the input reliability and the output reliability compensated for, and for outputting the output pixel data.

The foregoing object is achieved in yet another aspect of the present invention through the provision of a data processing method for processing input data and for outputting the processed input data as output data, including the steps of estimating the amount of noise included in the input data; calculating an input reliability indicating the reliability of the input data, according to the amount of noise; calculating an output reliability indicating the reliability of the output data; compensating for the output reliability according to the amount of noise; and processing the input data according to the input reliability and the output reliability compensated for, and for outputting the output data.

The foregoing object is achieved in yet still another aspect of the present invention through the provision of a storage medium for storing a computer-controllable program for processing input pixel data and for outputting the processed input pixel data as output pixel data, the program including the steps of calculating an input reliability indicating the reliability of the input pixel data; calculating an output reliability indicating the reliability of the output pixel data; detecting the motion amount of the input pixel data; calculating a motion-amount reliability indicating the reliability of the motion amount; compensating for the output reliability according to the motion-amount reliability; and processing the input pixel data according to the input reliability and the output reliability compensated for, and for outputting the output pixel data.

The foregoing object is achieved in a further aspect of the present invention through the provision of a storage medium for storing a computer-controllable program for processing input data and for outputting the processed input data as output data, the program including the steps of estimating the amount of noise included in the input data; calculating an input reliability indicating the reliability of the input data, according to the amount of noise; calculating an output reliability indicating the reliability of the output data; compensating for the output reliability according to the amount of noise; and processing the input data according to the input reliability and the output reliability compensated for, and for outputting the output data.

BRIEF DESCRIPTION OF THE DRAWINGS

FIG. 5A is a view illustrating variable-block-size block matching executed when a detection block and a reference block are included in an object.

FIG. 5B is a view illustrating variable-block-size block matching executed when a detection block and a reference block are expanded.

DESCRIPTION OF THE PREFERRED EMBODIMENTS

Figure 1A:
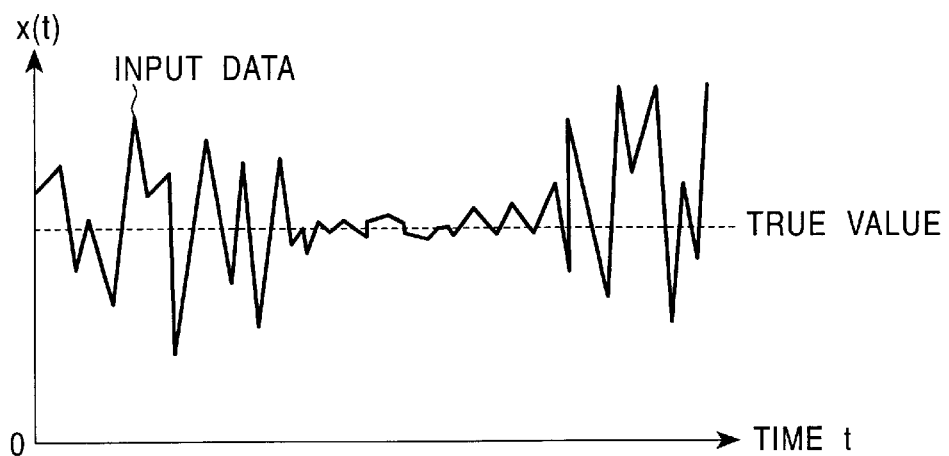
FIG. 1A is a waveform view of input data.

A noise removing apparatus according to an embodiment of the present invention will be described below in detail by referring to the drawings. The principle of removing noise according to the present invention will be first described.

To simplify a description, a case is examined in which input data having a constant true value and on which noise fluctuating in time is superposed, as shown in FIG. 1A, is added (accumulated) to remove the noise fluctuating in time. The noise is effectively removed by executing additions with a weight for input data having a large noise level, namely, having a low s/n ratio, being set to a small value and with a weight for input data having a small noise level, namely, having a high s/n ratio, being set to a large value.

Figure 1B:
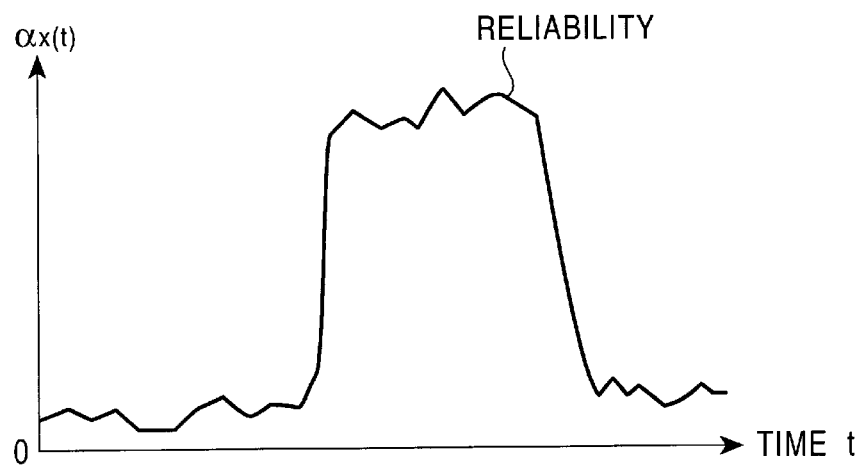
FIG. 1B is a view showing the reliability of the input data shown in FIG. 1.

As the evaluation value of input data, the degree of reliability indicating how the input data is close to the true value, which is the reliability of the input data against the true value, for example, as shown in FIG. 1B, is obtained. The average (weighted sum) of input data is calculated while the weight corresponding to the reliability is applied to the input data, to effectively remove the noise.

Output data y(t) with noise effectively being removed is obtained from the following expression by applying weighted additions to input data x(t) with the weight corresponding to the reliability of the input data x(t) being used, where x(t), y(t), and $\alpha_{x(t)}$ indicate the input data, the output data, and the reliability of the input data at the time "t," respectively.

$$y(t) = \frac{\sum_{i=0}^{t} \alpha_{x(i)} x(i)}{\sum_{i=0}^{t} \alpha_{x(i)}} \tag{1}$$

It is assumed in the expression (1) that a larger weight is given to input data x(t) having a higher reliability $\alpha_{x(t)}$.

The output data y(t−1), obtained one sample before the current time "t," is calculated as follows from the expression (1).

$$y(t-1) = \frac{\sum_{i=0}^{t-1} \alpha_{x(i)} x(i)}{\sum_{i=0}^{t-1} \alpha_{x(i)}} \tag{2}$$

As for the output data y(t), the degree of reliability $\alpha_{y(t)}$ indicating how the output data y(t) is close to the true value, which is the reliability of the output data y(t) against the true value, is introduced as an evaluation value of the output data y(t). The reliability $\alpha_{y(t-1)}$ of the output data y(t−1), obtained one sample before the current time "t," is defined by the following expression.

$$\alpha_{y(t-1)} = \sum_{i=0}^{t-1} \alpha_{x(i)} \tag{3}$$

According to the expression (3), the reliability $\alpha_{y(t-1)}$ of the output data y(t−1) is the sum of the reliability $\alpha_{x(i)}$ of the input data x(i) (i=0, 1, 2, . . . , t−1) processed so far. Therefore, the reliability $\alpha_{y(t-1)}$ of the output data y(t−1) is large when input data close to the true value has been input so far in many cases, and the reliability is small when input data close to the true value has been input so far in a few cases. In other words, the reliability $\alpha_{y(t-1)}$ of the output data y(t−1) reflects the closeness (reliability) of the input data which has been input so far to the true value. When input data which has been input so far is close to the true value, it means that the output data y(t−1) is also close to the true value. Conversely, when input data which has been input so far is distant from the true value, it means that the output value y(t−1) is also distant from the true value. Therefore, the reliability $\alpha_{y(t-1)}$ expressed by the expression (3) represents the closeness of the output data y(t−1) to the true value.

The output data y(t) and its reliability $\alpha_{y(t)}$ are expressed by expressions (4) and (5) with the use of the expressions (1) to (3).

$$y(t) = \frac{\overbrace{\sum_{i=0}^{t-1} \alpha_{x(i)} x(i)}^{\alpha_{y(t-1)} y(t-1)} + \alpha_{x(t)} x(t)}{\underbrace{\sum_{i=0}^{t-1} \alpha_{x(i)}}_{\alpha_{y(t-1)}} + \alpha_{x(t)}} = \frac{\alpha_{y(t-1)} y(t-1) + \alpha_{x(t)} x(t)}{\alpha_{y(t-1)} + \alpha_{x(t)}} \tag{4}$$

$$\alpha_{y(t)} = \alpha_{y(t-1)} + \alpha_{x(t)} \tag{5}$$

The weight used to obtain the output data y(t) at the time "t" is indicated by w(t), and defined by the following expression.

$$w(t) = \alpha_{y(t-1)} / (\alpha_{y(t-1)} + \alpha_{x(t)}) \qquad (6)$$

From the expression (6), the following expression is satisfied.

$$1 - w(t) = \alpha_{x(t)} / (\alpha_{y(t-1)} + \alpha_{x(t)}) \qquad (7)$$

With the use of the expressions (6) and (7), the output data y(t) in the expression (4) can be expressed in the following way by a weighted average (weighted addition) obtained by multiplications and an addition.

$$y(t) = w(t)y(t-1) + (1 - w(t))x(t) \qquad (8)$$

The weights w(t) and 1−w(t) used in the expression (8) can be obtained from the expression (6) with the use of the reliability $\alpha_{y(t-1)}$ of the output data y(t−1) obtained one sample before and the reliability $\alpha_{x(t)}$ of the current input data x(t). The reliability $\alpha_{y(t)}$ of the current output data y(t) in the expression (5) can also be obtained with the use of the reliability $\alpha_{y(t-1)}$ of the output data y(t−1) obtained one sample before and the reliability $\alpha_{x(t)}$ of the current input data x(t).

When the reliability $\alpha_{x(t)}$ of the input data x(t) and the reliability $\alpha_{y(t)}$ of the output data y(t) are expressed by several input data items in the vicinity in time of each data, or by the reciprocals of the corresponding variances $\sigma_{x(t)}^2$ and $\sigma_{y(t)}^2$, respectively, in other words, when the reliability $\alpha_{x(t)}$ and the reliability $\alpha_{y(t)}$ are set as follows, $$\alpha_{x(t)} = 1/\sigma_{x(t)}^2$$

$$\alpha_{y(t)} = 1/\sigma_{y(t)}^2 \qquad (9)$$

the weight w(t) in the expression (8) can be obtained by the following expression.

$$w(t) = \sigma_{x(t)}^2 / (\sigma_{y(t-1)}^2 + \sigma_{x(t)}^2) \qquad (10)$$

In this case, 1−w(t) in the expression (8) can be obtained by the following expression.

$$1 - w(t) = \sigma_{y(t-1)}^2 / (\sigma_{y(t-1)}^2 + \sigma_{x(t)}^2) \qquad (11)$$

A term, $\sigma_{y(t)}^2$, can be obtained by the following expression.

$$\sigma_{y(t)}^2 = w(t)^2 \sigma_{y(t-1)}^2 + (1 - w(t))^2 \sigma_{x(t)}^2 \qquad (12)$$

It is clear from the expression (4) that the expression (8) obtained from the expressions (4) and (5) shows that the input data x(t) is weighted by the weight corresponding to the reliability $\alpha_{x(t)}$ thereof, the output data y(t−1) obtained one sample before is also weighted by the weight corresponding to the reliability $\alpha_{y(t-1)}$ thereof, the weighted input data and the weighted output data are added, and the sum is used as the output data y(t) obtained by removing noise from the input data x(t).

The reliability $\alpha_{x(t)}$ corresponding to the weight for the input data x(t) indicates the closeness of the input data x(t) to the true value, and the reliability $\alpha_{y(t-1)}$ corresponding to the weight for the output data y(t−1) obtained one sample before indicates the closeness of the output data y(t−1) to the true value. Since the true value is constant in the this case, when the output data y(t) is obtained by the expression (8), which executes an addition with whichever of the input data x(t) and the output data y(t−1) closer to the true value being considered more important, the output data y(t) is closer to the true value.

In other words, a small weight is applied to input data having a small reliability, which has been input, a large weight is applied to that having a large reliability, and the input data weighted in such a way is summed to obtain the output data y(t) by the expression (8) (equivalent to the expression (1)) led from the expression (1). More intuitively, the output data y(t) is obtained by adding input data such that input data having much noise does not affect much and input data having little noise affects much.

Therefore, when the whole average is obtained, both input data having a low s/n ratio and input data having a high s/n ratio affect output data at the same level. According to the expression (8), however, in the present embodiment, input data having a low s/n ratio affects output data little, and input data having a high s/n ratio affects the output data much. As a result, the output data with noise being more effectively removed than in a case the whole average is used is obtained.

When the moving average is obtained, input data distant in time do not affect output data at all even if it has a high s/n ratio, and input data close in time affects the output data much even if it has a low s/n ratio. According to the expression (8), however, in the present embodiment, input data affects the output data according to its s/n ratio irrespective of the closeness in time. As a result, the output data with noise being more effectively removed than in a case when the moving average is used is obtained.

As described above, according to the expression (8), the output data becomes close to the true value by the effect of input data having a high reliability (close to the true value). Therefore, as input data having a high reliability is processed in many cases, the output data approaches the true value. As a result, the s/n ratio of the output data is improved as time elapses.

In the above-described case, it is assumed that the true value is constant. For data with the true value being changed, it is necessary, for example, to divide the data into zones in which it is considered that the true value is constant, and to apply the processing to each zone.

In the above-described case, the variance of some input data items disposed in the vicinity in time is used as the reliability (hereinafter called input reliability) of the input data. In this case, the input reliability, output data, or the reliability (hereinafter called output reliability) of the output data cannot be obtained until the some input data items are input. Until input data items used for obtaining input reliability are input, it is possible, for example, that input reliability or output reliability is not calculated, and the simple average of input data which has been input so far is obtained and used as the output data. A method used until input data items used for obtaining input reliability are input is not limited to the above one.

When input data x(t) is one-dimensional data, such as audio data, output data y(t−1) is obtained as a result of processing of input data x(t−1), which is obtained one sample before the input data x(t). When input data x(t) is two-dimensional data, such as image data, output data y(t−1) is obtained, for example, as a result of processing of input data x(t−1), which is obtained one frame (or field) before the input data x(t).

Specifically, when a pixel (to be correct, the pixel value of the pixel) in the t-th frame is called x(t); noise is removed according to the expression (8) from the pixel x(t) serving as an input pixel; and the resultant output pixel is output, an input pixel x(t−1) indicates an input pixel in the (t−1)-th frame corresponding to the input pixel x(t) in the t-th frame. An output pixel y(t−1) indicates the pixel obtained by removing noise from the input pixel x(t−1).

Since an image generally has a motion, the position of the input pixel x(t) may be not the same as that of the output pixel y(t−1) obtained on frame before. Therefore, when noise is removed by the expression (8), it is necessary to detect the output pixel y(t−1) corresponding to the input pixel x(t).

The output pixel y(t−1) corresponding to the input pixel x(t) can be obtained according to the detected motion vector (vector indicating the position of the output pixel y(t−1) with the input pixel x(t) being used as a reference) of the input pixel x(t), but the motion vector is not necessarily obtained correctly. Therefore, even when the output pixel y(t−1) is detected according to such a motion vector, the output pixel y(t−1) may be shifted from the pixel in the preceding frame truly corresponding to the input pixel x(t).

Because such an output pixel y(t−1) is shifted from the value which should be used in the calculation of the expression (8), it is considered that the output reliability $\alpha_{y(t-1)}$ of the output pixel y(t−1) is reduced by the shift.

In other words, when the input pixel x(t) has a motion, the motion affects the output reliability $\alpha_{y(t-1)}$ of the output pixel y(t−1).

Therefore, the degree "m" of the reliability (hereinafter called a vector reliability, if necessary) indicating the reliability (closeness to the true value) of a motion vector is introduced and the output reliability $\alpha_{y(t-1)}$ is compensated for by "m," used as a compensation term, to be $m \times \alpha_{y(t-1)}$.

In this case, the output reliability $\alpha_{y(t)}$ to be obtained by the expression (5) is obtained by the following expression.

$$\alpha_{y(t)} = m\alpha_{y(t-1)} + \alpha_{x(t)} \quad (13)$$

The weight w(t) to be obtained by the expression (6) is obtained by the following expression.

$$w(t) = m\alpha_{y(t-1)}/(m\alpha_{y(t-1)} + \alpha_{x(t)}) \quad (14)$$

Since the output reliability $\alpha_{y(t-1)}$ is compensated for by multiplying it by the vector reliability "m," as described above, it is necessary that the vector reliability "m" be closer to 1 as the motion vector is closer to the true value and the vector reliability "m" be a small value less than 1 as the motion vector is farther to the true value. It is assumed, for example, that the vector reliability "m" is defined by the following expression.

$$m = N(t)/D(t) \quad (15)$$

where N(t) indicates the (estimated) amount of noise of the input pixel x(t), and D(t) indicates a residual obtained after motion compensation performed with the motion vector obtained for the input pixel (t). As this residual, the absolute value of the difference between the input pixel x(t) and the output pixel y(t−1) (output pixel y(t−1) obtained one frame before, at the position shifted from the position of the input pixel x(t) by the motion vector) obtained one frame before, corresponding to the input pixel x(t).

In this case, since D(t) is calculated by using the input pixel x(t) having noise and the output pixel y(t−1) from which noise is removed, D(t) includes noise as well as the true residual. Therefore, from the expression (15), the vector reliability "m" is obtained by a calculation of [amount of noise]/([amount of noise]+[true residual]). Therefore, when the true residual approaches zero, the vector reliability becomes closer to 1, and when the true residual is large, the vector reliability is a small value less than 1.

Figure 2:
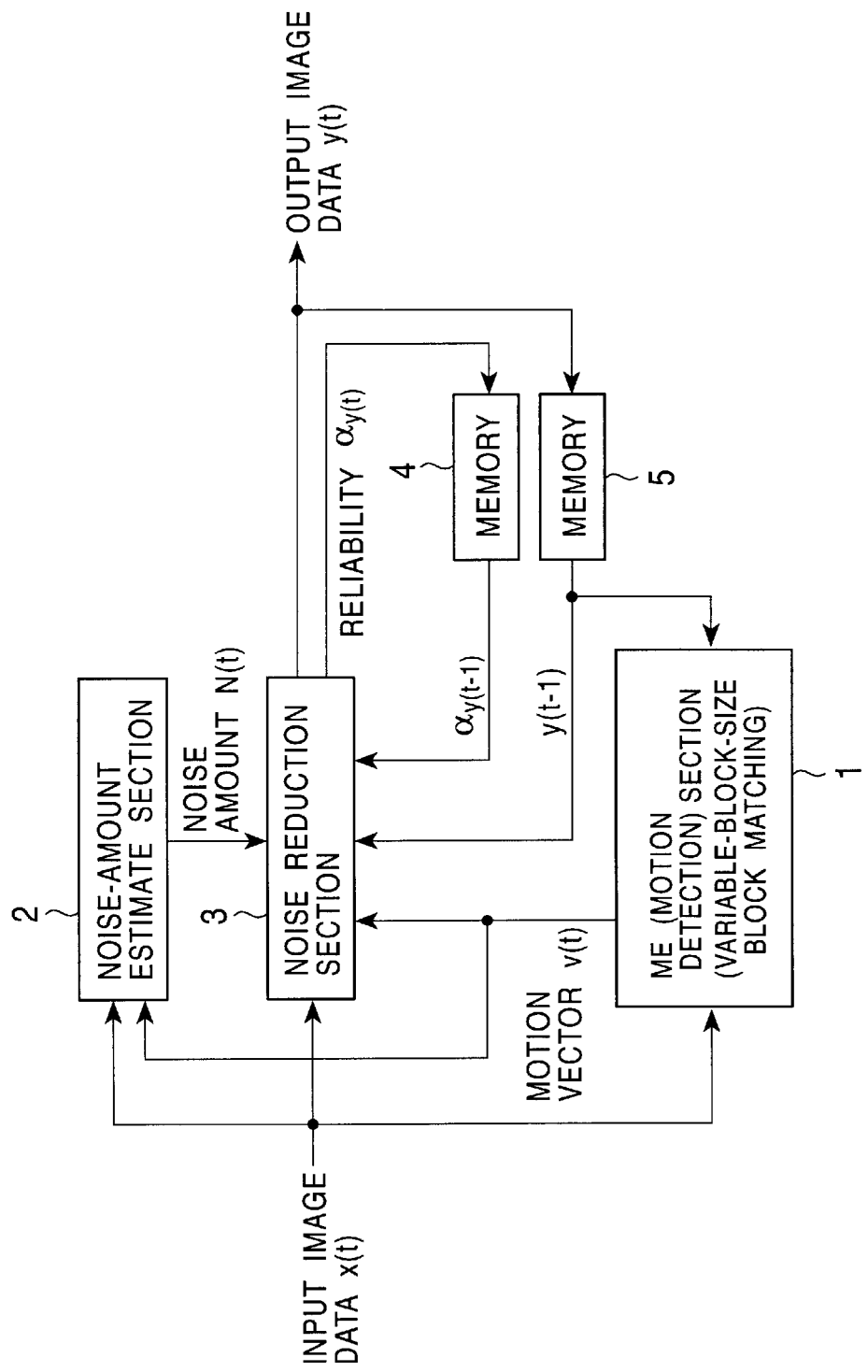
FIG. 2 is a block diagram of a noise removing apparatus according to an embodiment of the present invention.

FIG. 2 shows an example structure of a noise removing apparatus for removing noise from an image by the principle described above, according to an embodiment. In this noise removing apparatus, the motion vector of an input pixel x(t) is detected, and its vector reliability "m" is obtained by the expression (15). Output reliability $\alpha_{y(t-1)}$ is compensated for by the vector reliability "m," used as a compensation term, a weight w(t) is obtained by the expression (14), and finally the expression (8) is calculated to output the output pixel y(t) obtained by effectively removing noise from the input pixel x(t).

Input pixels constituting an input image from which noise is to be removed are sent to an ME (motion detection) section 1, a noise-amount estimate section 2, and a noise reduction section 3.

The ME section 1 also receives output pixels obtained one frame before, stored in a memory 5, in addition to the input pixels. The ME section 1 detects the motion vectors of the input pixels, and sends the motion vectors to the noise-amount estimate section 2 and to the noise reduction section 3. The noise-amount estimate section 2 estimates the amount of noise of the received input image, for example, in units of frames, and sends it to the noise reduction section 3.

The noise reduction section 3 receives the output reliability of the output pixels obtained one frame before, from a memory 4 and the output pixels obtained one frame before, from the memory 5, in addition to the input pixels, their motion vectors, and the amount to noise, as described above. The noise reduction section 3 calculates the input reliability of the input pixels, processes the input pixels according to the expressions (8) and (13) to (15), and then outputs the output pixels obtained by removing noise from the input pixels. The output pixels are output as the processing result of the input pixels, and also sent to the memory 5. The noise reduction section 3 executes processing according to the expression (14), as described above, to obtain the output reliability of the output pixels. The output reliability is sent to the memory 4.

The memory 4 and the memory 5 store the output reliability and the output pixels output from the noise reduction section 3, respectively.

Figure 3:
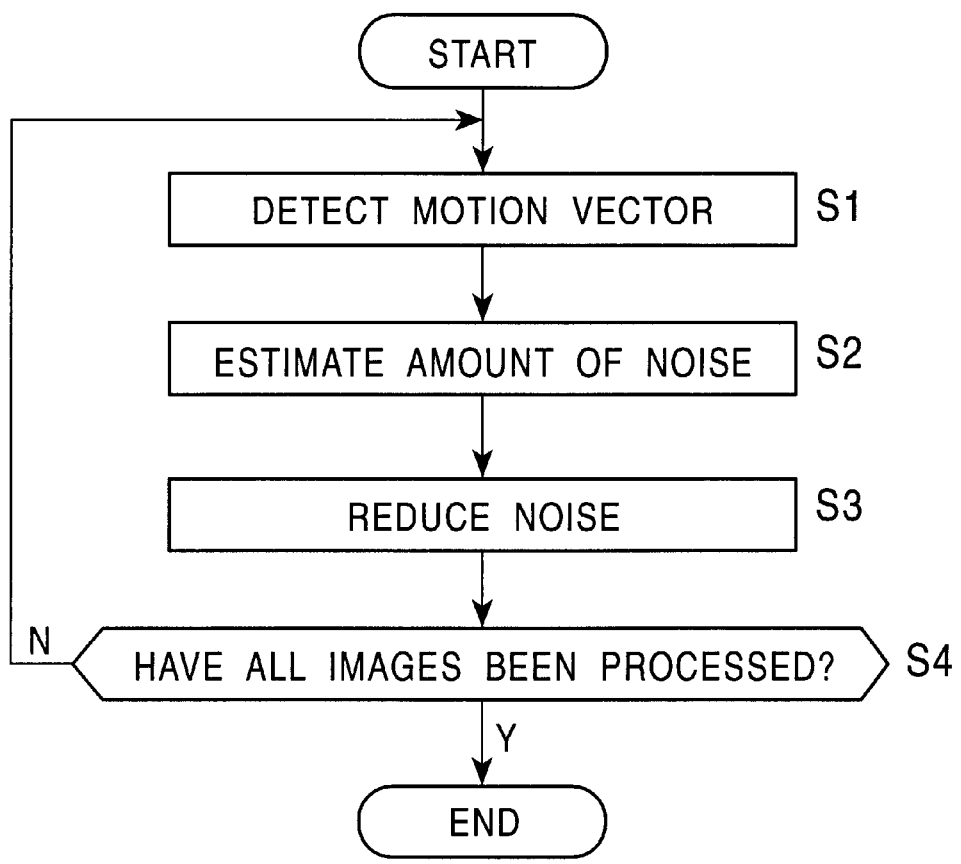
FIG. 3 is a flowchart of processing executed by the noise removing apparatus shown in FIG. 2.

Processing executed by the noise removing apparatus shown in FIG. 1 will be described next by referring to a flowchart shown in FIG. 3.

When the input pixels of a frame start being input into the ME section 1, the output pixels obtained one frame before, stored in the memory 5 are read and sent to the ME section 1. The ME section 1 detects the motion vectors of the input pixels, for example, by variable-block-size block matching, described later, with the use of the received input pixels and the output pixels obtained one frame before, and sends them to the noise-amount estimate section 2 and to the noise reduction section 3, in a step S1.

In a step S2, the noise-amount estimate section 2 determines a still portion in the frame (hereinafter called the aimed-at frame, if necessary) having the input pixels according to the motion vectors of the input pixels, and estimates the amount of noise in the aimed-at frame by using the input pixels disposed in the still portion. The estimate result of the amount of noise is sent to the noise reduction section 3.

The noise reduction section 3 obtains the input reliability $\alpha_{x(t)}$ of the input pixels x(t) according to the amount of noise sent from the noise-amount estimate section 2, and calculates the expressions (8) and (13) to (15) by using the output reliability $\alpha_{y(t-1)}$ and the output pixels y(t−1) obtained one frame before, stored in the memory 4 and the memory 5, respectively. With these operations, the output pixels y(t) to be acquired by removing noise from the input pixels x(t), and its reliability $\alpha_{y(t)}$ are obtained. The output pixel y(t) and its reliability $\alpha_{y(t)}$ are sent to the memory 5 and the memory 4, respectively, and stored.

When all input pixels constituting the aimed-at frame have been processed as described above, the processing proceeds to a step S4 and a control section (not shown) determines whether the next frame is found. When it is determined that the next frame is found, the processing returns to the step S1 and the same processes as those described above are repeated. When the control section determines in the step S4 that the next frame is not found, the processing is terminated.

Figure 4:
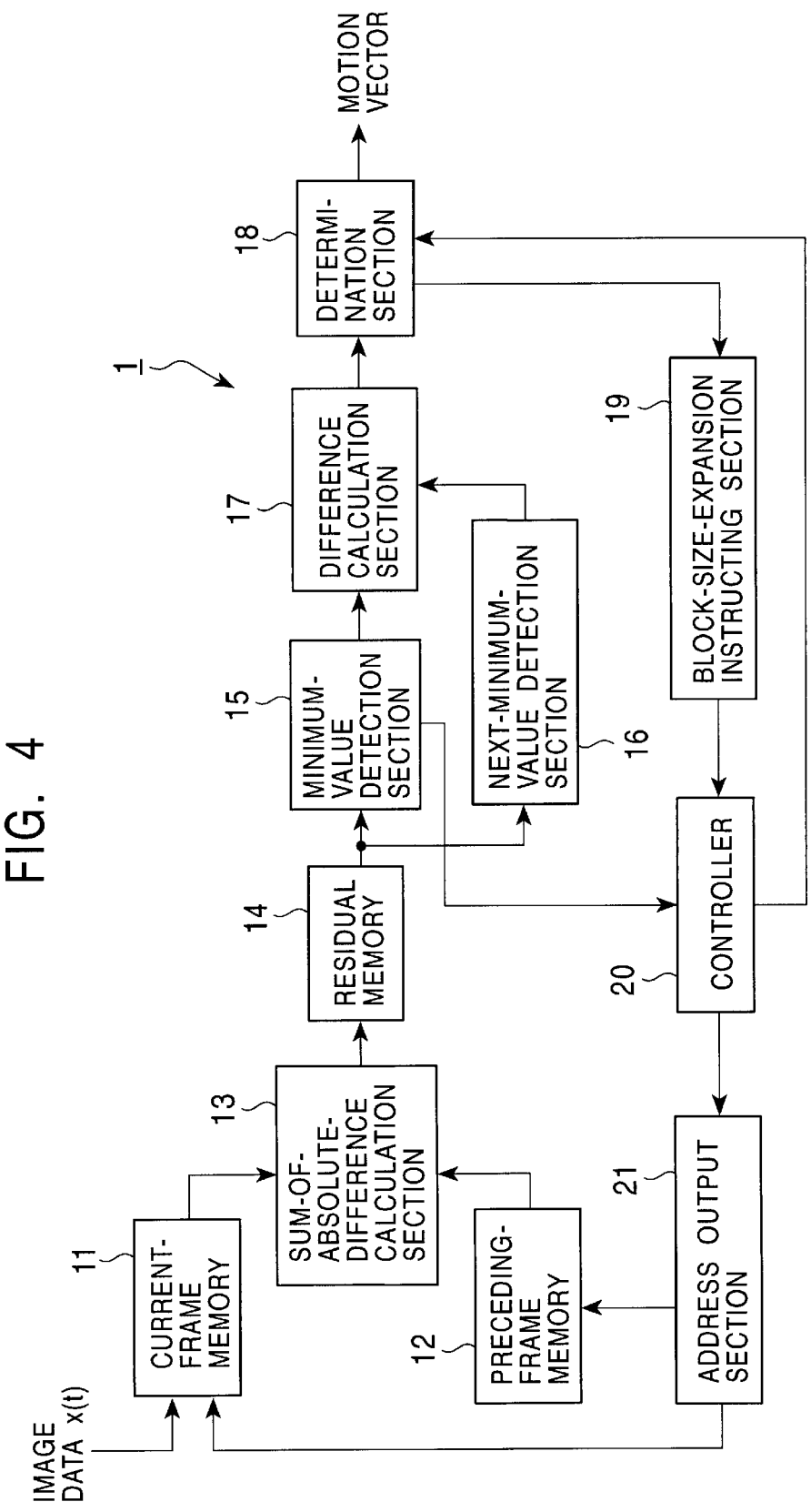
FIG. 4 is a block diagram of an ME section 1 shown in FIG. 2.

FIG. 4 shows an example structure of the ME section 1 shown in FIG. 2.

A current-frame memory 11 sequentially receives and stores the input pixels x(t) constituting the aimed-at frame. The current-frame memory 11 reads the pixels constituting a predetermined-size block (hereinafter called a reference block, if necessary) in which a predetermined aimed-at input pixel is disposed at the center, among the stored input pixels x(t) according to the addresses output from an address output section 21, and sends them to a sum-of-absolute-difference calculation section 13.

A preceding-frame memory 12 sequentially receives the output pixels y(t−1) constituting the frame one frame before the aimed-at frame, stored in the memory 5, and stores the output pixels y(t−1), obtained by removing noise from the preceding frame (frame one frame before the aimed-at frame) in the noise reduction section 3. The preceding-frame memory 12 reads the pixels constituting a block (hereinafter called a detection block, if necessary) having the same size as the reference block, among the stored output pixels y(t−1) according to the addresses output from the address output section 21, and sends them to the sum-of-absolute-difference calculation section 13.

The sum-of-absolute-difference calculation section 13 calculates the differences between the input pixels constituting the reference block, sent from the current-frame memory 11, and the output pixels constituting the detection block, sent from the preceding-frame memory 12 at the identical positions in the blocks, obtains the sum of the absolute values of the differences, and sends it as a residual to a residual memory 14. The residual memory 14 stores the residual sent from the sub-of-absolute-difference calculation section 13.

A minimum-value detection section 15 detects the minimum value (hereinafter called the minimum residual, if necessary) of the residuals stored in the residual memory 14, and sends the minimum residual to a difference calculation section 17. The minimum-value detection section 15 also sends the address at which the minimum residual is stored in the residual memory 14, to a controller 20.

A next-minimum-value detection section 16 detects the next minimum value (hereinafter called the next-minimum residual) of the residuals stored in the residual memory 14, and sends the next-minimum residual to the difference section 17. The difference calculation section 17 calculates the difference between the next-minimum residual sent from the next-minimum-value detection section 16 and the minimum residual sent from the minimum-value detection section 15, namely, subtracts the minimum residual from the next-minimum residual, and sends the difference to a determination section 18.

The determination section 18 determines according to the difference sent from the difference calculation section 17 whether the block size of the reference block and the detection block is to be expanded, and sends the result of determination to a block-size-expansion instructing section 19. The determination section 18 also outputs a candidate vector sent from the controller 20 as the motion vector of the input pixel, according to the result of determination.

The block-size-expansion instructing section 19 instructs the controller 20 to expand the block size of the reference block and the detection block according to the result of determination in the determination section 18.

The controller 20 sequentially sets each input pixel of the aimed-at frame stored in the current-frame memory 11 to an aimed-at input pixel, and controls the address output section 21 so as to output the addresses where the input pixels constituting the reference block in which the aimed-at input pixel is disposed at the center are stored in the current-frame memory 11. The controller 20 also sequentially specifies a plurality of vectors (candidate vectors) serving as candidate motion vectors of the input pixel, and controls the address output section 21 so as to output the addresses where the output pixels constituting the detection block in which the output pixel disposed at the position shifted from the position of the aimed-at input pixel by each candidate vector is located at the center are stored in the preceding-frame memory 12. In this case, the block size of the reference block and the detection block is specified according to the instruction of the block-size-expansion instructing section 19.

According to the address where the minimum residual sent from the minimum-value detection section 15 is stored in the residual memory 14, the controller 20 further detects a candidate vector used when the minimum residual is obtained, and sends the candidate vector to the determination section 18.

The address output section 21 sends the addresses of the input pixels and those of the output pixels to be read, to the current-frame memory 11 and the preceding-frame memory 12, respectively, according to the control of the controller 20.

The ME section 1 structured as described above performs variable-block-size block matching to detect the motion vector of each input pixel constituting the aimed-at frame.

When motion detection is executed with the n-th frame being set to an aimed-at frame in the (n−1)-th and n-th frames in which an image having an object which is large to some extent moving is displayed, if a detection block and a reference block are smaller in size than the large object having almost uniform pixel values, as shown in FIG. 5A, and the detection block and the reference block are disposed within the object, since residuals (the sums of the absolute values of the differences calculated by the sum-of-absolute-difference calculation section 13) at any positions do not differ much, it is difficult to detect a highly precise motion vector.

Therefore, in such a case, the block size of the detection block and the reference block is increased (expanded), as shown in FIG. 5B. Then, the detection block or the reference block is not included in the object, and the blocks are extended beyond the object. Consequently, residuals differ much between cases in which the detection block is disposed at the position corresponding to that of the reference block or not. As a result, it is possible that a highly precise motion vector is detected.

In variable-block-size block matching, the block size is changed, as required, and block matching (detection of the minimum residual) is executed, as described above.

Figure 6:
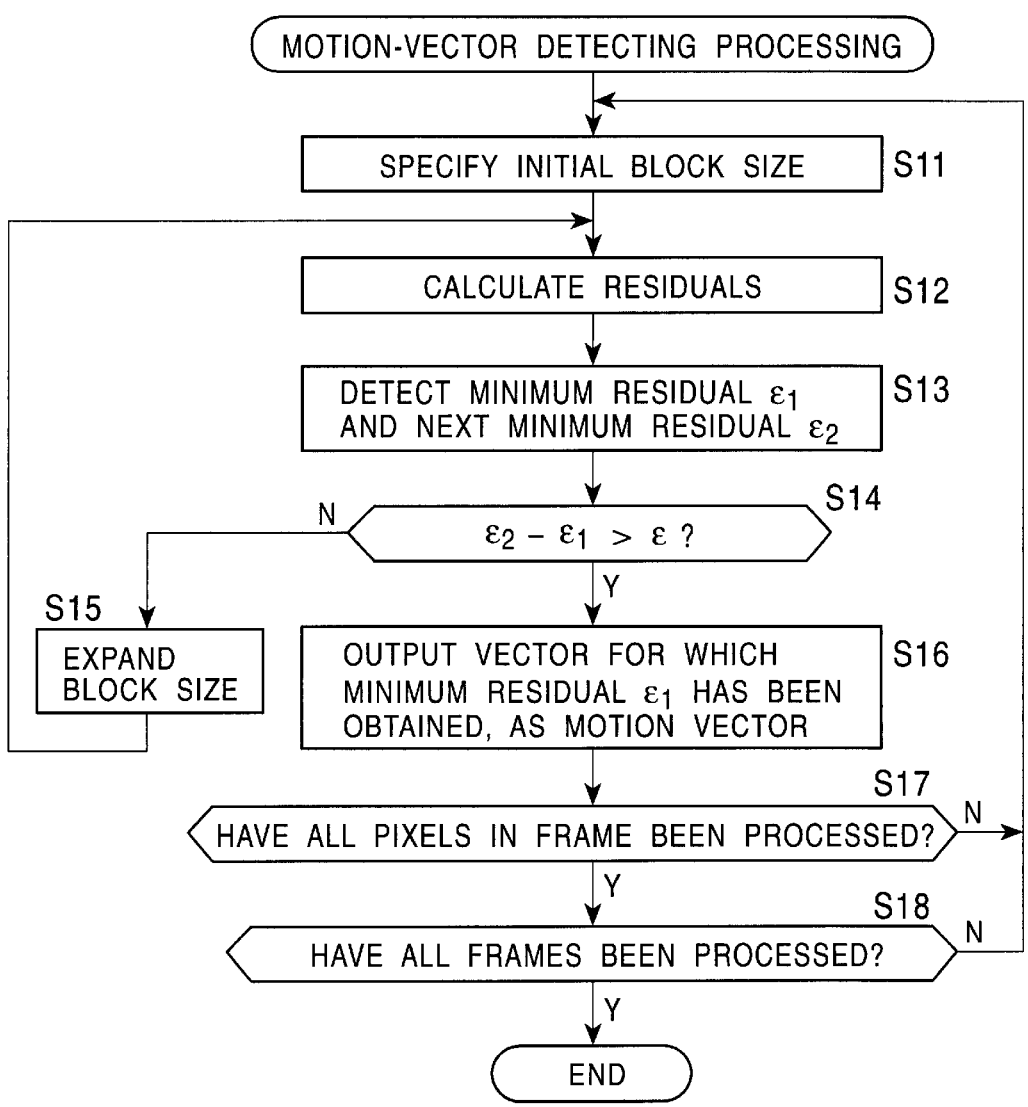
FIG. 6 is a flowchart of processing executed by the ME section 1 shown in FIG. 4.

Motion-vector detection processing executed by the ME section 1 shown in FIG. 4 will be described next by referring to a flowchart shown in FIG. 6.

The current-frame memory 11 sequentially receives and stores the input pixels x(t), and the preceding-frame memory 12 sequentially receives and stores the output pixels y(t−1) stored in the memory 5.

In the motion-vector detection processing, at first, the block-size-expansion instructing section 19 sets the block size to a predetermined initial value and sends it to the controller 20 in a step S11. The controller 20 controls the address output section 21 so as to output the addresses at which the pixels of a reference block and a detection block both having the block size specified by the block-size-expansion instructing section 19 are read from the current-frame memory 11 and the preceding-frame memory 12.

More specifically, the controller 20 sets an input pixel disposed in the aimed-at frame stored in the current-frame memory 11 to an aimed-at input pixel, and controls the address output section 21 so as to output the addresses at which the input pixels disposed within the reference block having the specified size in which the aimed-at input pixel is located at the center are stored in the current-frame memory 11. The controller 20 also sequentially specifies a plurality of candidate vectors serving as candidate motion vectors of the input pixel, and controls the address output section 21 so as to output the addresses where the output pixels constituting the detection block having the specified size in which the output pixel disposed at the position shifted from the position of the aimed-at input pixel by each candidate vector is located at the center are stored in the preceding-frame memory 12.

With these operations, the input pixels disposed within the reference block in which the aimed-at input pixel is located at the center are read from the current-frame memory 11, and sent to the sum-of-absolute-difference calculation section 13. In addition, the output pixels disposed within the detection block in which the output pixel disposed at the position shifted from the position of the aimed-at input pixel by each of the plurality of candidate vectors is located at the center are sequentially read from the preceding-frame memory 12, and sent to the sum-of-absolute-difference calculation section 13. In the following processing, block matching is executed between the reference block sent from the current-frame memory 11 and each of the detection blocks corresponding to the plurality of candidate vectors, sent from the preceding-frame memory 12.

More specifically, the sub-of-absolute-difference calculation section 13 calculates the sum of the absolute values of the differences between corresponding pixels in the reference block and each of the detection blocks corresponding to the plurality of candidate vectors, in a step S12. The sums of the absolute values of the differences are sequentially sent to the residual memory 14 as the residuals corresponding to the plurality of candidate vectors. The residual memory 14 stores the residuals corresponding to the plurality of candidate vectors at the corresponding addresses.

Then, the processing proceeds to a step S13. The minimum-value detection section 15 detects the minimum residual $\epsilon_1$ of the residuals stored in the residual memory 14, and the next-minimum-value detection section 16 detects the next-minimum residual $\epsilon_2$. The minimum residual $\epsilon_1$ and the next-minimum residual $\epsilon_2$ are sent to the difference calculation section 17, and the difference $\epsilon_2-\epsilon_1$ therebetween is calculated. The difference $\epsilon_2-\epsilon_1$ obtained by the difference calculation section 17 is sent to the determination section 18. In a step S14, the determination section 18 determines whether the difference $\epsilon_2-\epsilon_1$ is larger than a predetermined threshold $\epsilon$.

When it is determined in the step S14 that the difference $\epsilon_2-\epsilon_1$ is not larger than the predetermined threshold $\epsilon$, in other words, when only a slight difference is calculated between the minimum residual $\epsilon_1$ and the next-minimum residual $\epsilon_2$, and therefore, it is expected that the block size is small as shown in FIG. 5A, the processing proceeds to a step S15. The block-size-expansion instructing section 19 instructs the controller 20 to expand the block size. In this case, the controller 20 controls the address output section 21 so as to output the addresses corresponding to the reference block and the detection block for which the block size has been expanded according to the instruction sent from the block-size-expansion instructing section 19.

With these operations, the input pixels disposed within the expanded reference block in which the aimed-at input pixel is located at the center are read from the current-frame memory 11, and the output pixels disposed within the expanded detection block in which the output pixel disposed at the position shifted from the position of the aimed-at input pixel by each of the plurality of candidate vectors is located at the center are sequentially read from the preceding-frame memory 12. The processing returns to the step S12, and the same processes as those described above are repeated. In other words, block matching is executed between the reference block and each of the detection blocks both having a large block size.

When it is determined in the step S14 that the difference $\epsilon_2-\epsilon_1$ is larger than the predetermined threshold $\epsilon$, in other words, when a large difference is calculated between the minimum residual $\epsilon_1$ and the next-minimum residual $\epsilon_2$, and therefore, it is expected that the block size is appropriate as shown in FIG. 5B, the processing proceeds to a step S16. The determination section 18 outputs the candidate vector for which the minimum residual $\epsilon_1$ has been obtained, as the motion vector of the aimed-at input pixel.

More specifically, in this case, the minimum-value detection section 15 outputs the address where the minimum residual $\epsilon_1$ is stored in the residual memory 14, to the controller 20. The controller 20 recognizes the candidate vector for which the minimum residual has been obtained, by the use of this address. Then, the controller 20 sends the candidate vector to the determination section 18. The determination section 18 outputs the candidate vector sent from the controller 20 as the motion vector of the aimed-at input pixel.

The processing proceeds to a step S17, and the controller 20 determines whether all the input pixels of the frame stored in the current-frame memory 11 have been set to aimed-at input pixels and the motion vectors thereof have been detected. When the controller 20 determines in the step S17 that all the input pixels of the frame stored in the current-frame memory 11 have not yet been set to aimed-at input pixels, the processing returns to the step S11, an input pixel which has not yet been set to an aimed-at input pixel is set to a new aimed-at input pixel, and the same processes as those described above are repeated.

When the controller 20 determines in the step S17 that all the input pixels of the frame stored in the current-frame memory 11 have already been set to aimed-at input pixels, the processing proceeds to the step S18, and the controller 20 determines whether a frame to be processed next is found. When the controller 20 determines in the step S18 that a frame to be processed next is found, in other words, when the next frame is sent to the current-frame memory 11, the processing returns to the step S11 and the same processes as those described above are repeated.

When the controller 20 determines in the step S18 that a frame to be processed next is not found, the motion-vector detection processing is terminated.

A motion vector is detected by variable-block-size block matching. A motion vector can be detected with the block size of a reference block and a detection block being fixed.

Figure 7:
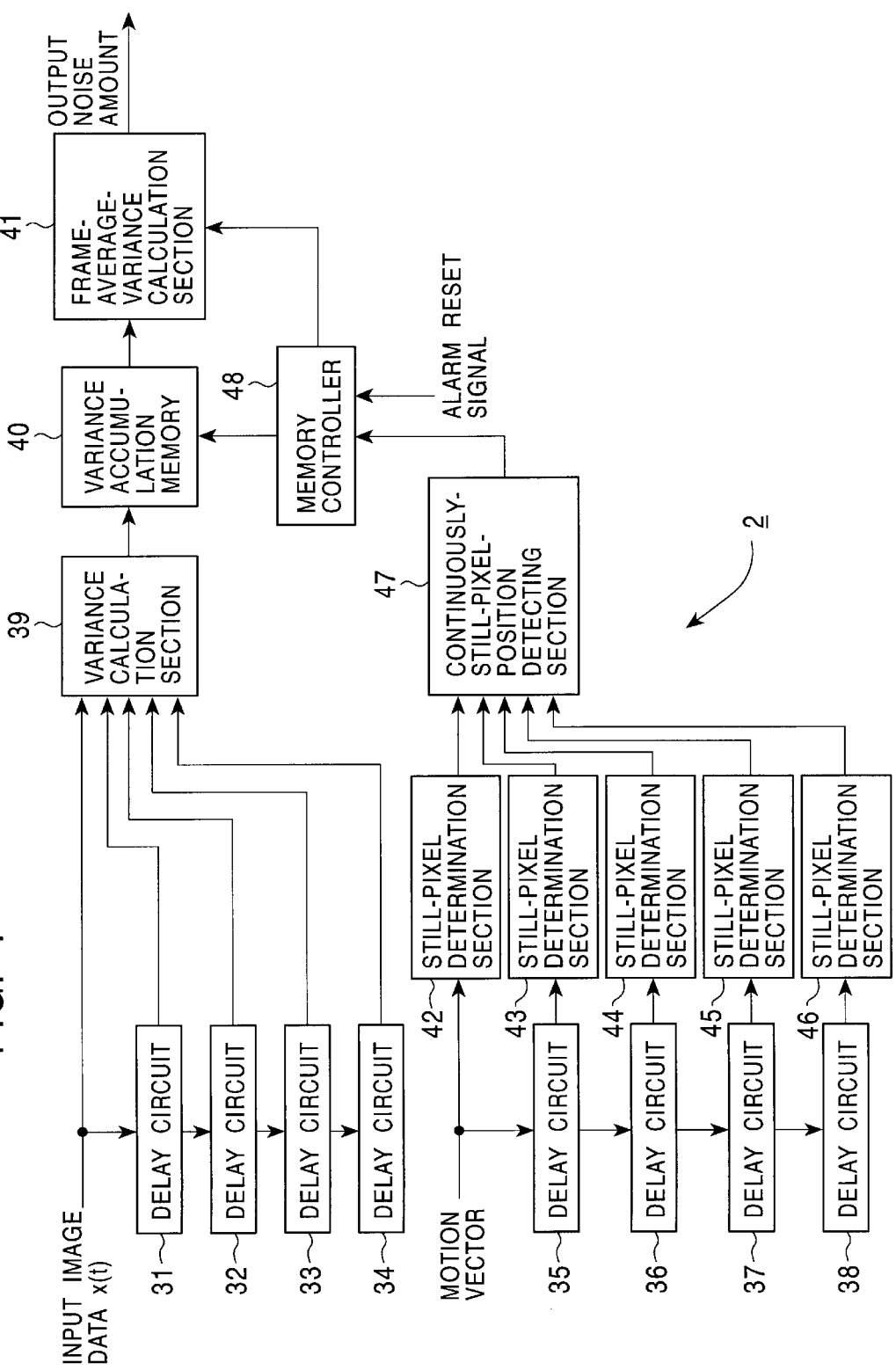
FIG. 7 is a block diagram of a noise-amount estimate section 2 shown in FIG. 2.

FIG. 7 shows an example structure of the noise-amount estimate section 2 shown in FIG. 2.

An input pixel x(t) to be processed are input to a delay circuit 31 and to a variance calculation section 39. The motion vector of the input pixel x(t), detected by the ME section 1 is input to a delay circuit 35 and to a still-pixel determination section 42.

The delay circuit 31 delays the received input pixel x(t) by the time corresponding to one frame, and sends it as an input pixel x(t−1) to a delay circuit 32 and to the variance calculation section 39. The delay circuit 32 delays the input pixel x(t−1) sent from the delay circuit 31, by the time corresponding to one frame, and sends it as an input pixel x(t−2) to a delay circuit 33 and to the variance calculation section 39. The delay circuit 33 delays the input pixel x(t−2) sent from the delay circuit 32, by the time corresponding to one frame, and sends it as an input pixel x(t−3) to a delay circuit 34 and to the variance calculation section 39. The delay circuit 34 delays the input pixel x(t−3) sent from the delay circuit 33, by the time corresponding to one frame, and sends it as an input pixel x(t−4) to the variance calculation section 39.

Each of delay circuits 35 to 38 applies the same delay processing to the motion vector as each of the delay circuits 31 to 34. Therefore, when the motion vector of the input pixel x(t) is called v(t), for example, the delay circuits 35 to 38 output motion vectors v(t−1) to v(t−4), respectively. The motion vectors v(t−1) to v(t−4) are sent to still-pixel determination sections 43 to 46, respectively.

The variance calculation section 39 calculates the variance of the received input pixels x(t) to x(t−4), and sends it to a variance accumulation memory 40. The variance accumulation memory 40 accumulates the variances sent from the variance calculation section 39 under the control of a memory controller 48. A frame-average-variance calculation section 41 calculates the average (divides the accumulated variance value by the number of the accumulated variances) of the variances accumulated in the variance accumulation memory 40, and outputs it as the amount of noise of the input pixel x(t).

The still-pixel determination section 42 determines according to the received motion vector v(t) whether the input pixel x(t) belongs to a still portion, and sends the result of determination to a continuously-still-pixel-position detecting section 47. The still-pixel determination sections 43 to 46 also determine according to the motion vectors v(t−1) to v(t−4) sent from the delay circuits 35 to 38 whether the input pixels x(t−1) to x(t−4) belong to still portions, and send the results of determination to the continuously-still-pixel-position detecting section 47.

The continuously-still-pixel-position detecting section 47 detects the position of the pixels belonging to still portions in continuous frames according to the results of determination sent from the still-pixel determination sections 42 to 46. More specifically, the continuously-still-pixel-position detecting section 47 detects an input pixel x(t) disposed at a position where all of the results of determination sent from the still-pixel determination sections 42 to 46 indicate still portions, and sends the position to the memory controller 48.

The memory controller 48 controls the variance accumulation memory 40 so as to accumulate only the variances obtained from pixels disposed at the still portions, sent from the continuously-still-pixel-position detecting section 47, among the variances output from the variance calculation section 39. A frame reset signal indicating that the input pixels of a new frame start being sent is transmitted to the memory controller 48. When the memory controller 48 receives a frame reset signal, the memory controller 48 instructs the frame-average-variance calculation section 41 to calculate the average of the accumulated variance value stored in the variance accumulation memory 40, and resets the stored value of the variance accumulation memory 40 to zero.

In the noise-amount estimate section 2 structured as described above, only input pixels disposed at still portions among the input pixels constituting the frame (aimed-at frame) to be processed (by noise removing processing) are used to execute noise-amount estimate processing for estimating the amount of noise of the input pixels.

Figure 8:
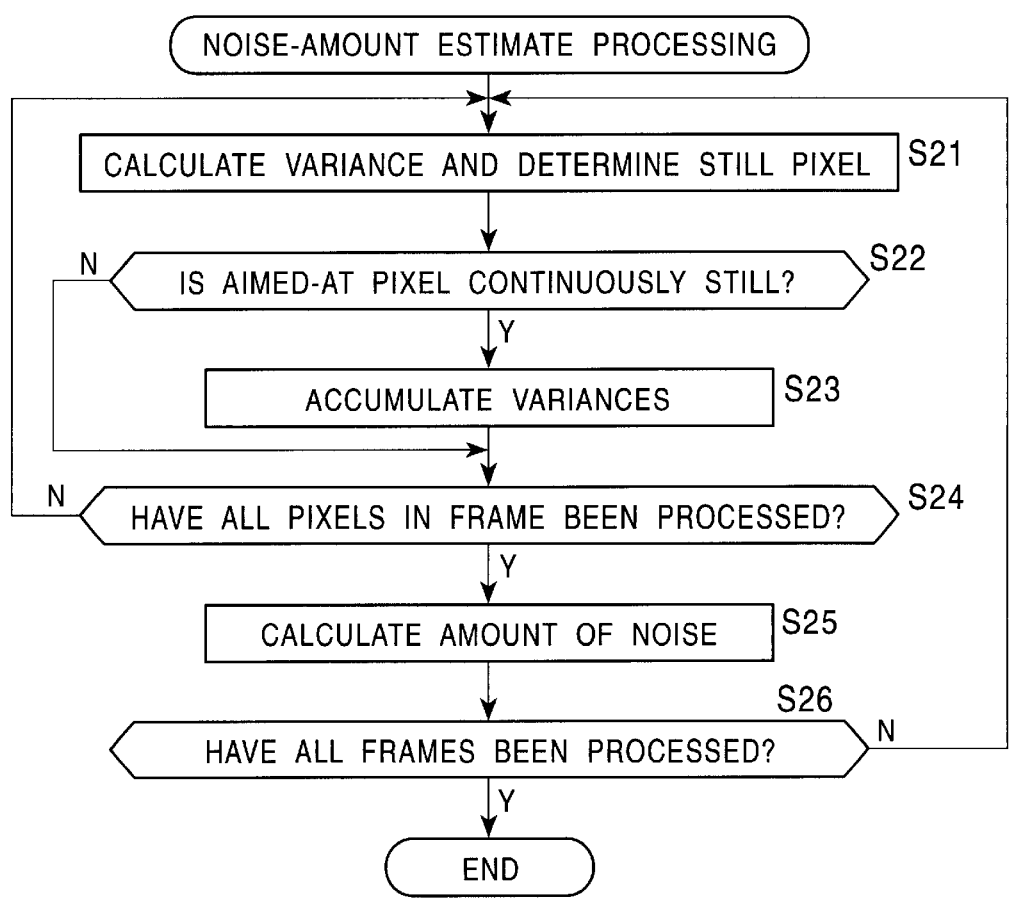
FIG. 8 is a flowchart of processing executed by the noise-amount estimate section 2 shown in FIG. 7.

FIG. 8 is a flowchart of the noise-amount estimate processing.

In the noise-amount estimate processing, at first in a step S21, a predetermined input pixel constituting the aimed-at frame is set to an aimed-at input pixel x(t), the variance of five pixels, the aimed-at input pixel x(t) and the input pixels x(t−1) to x(t−4) disposed at the same position as the aimed-at input pixel x(t) in the four past frames, is calculated, and it is determined whether each of the five pixels x(t) to x(t−4) is a pixel (still pixel) belonging to a still portion.

More specifically, the delay circuit 31 and the variance calculation section 39 receive the input pixel x(t) constituting the aimed-at frame, and the delay circuit 35 and the still-pixel determination section 42 receive the motion vector v(t) of the input pixel x(t), detected by the ME section 1.

Each of the delay circuits 31 to 34 delays the received input pixel by the time corresponding to one frame, and sends it to the variance calculation section 39. With this operation, the variance calculation section 39 receives the input pixels x(t) to x(t−4) at the same timing. The variance calculation section 39 obtains the variance of the input pixels x(t) to x(t−4) and sends it to the variance accumulation memory 40.

The delay circuits 35 to 38 delay the received motion vectors by the time corresponding to one frame, and send them to the still-pixel determination sections 43 to 46, respectively. Therefore, the still-pixel determination sections 42 to 46 receive the motion vectors v(t) to v(t−4) of the input pixels x(t) to x(t−4) at the same timing. The still-pixel determination sections 42 to 46 determine according to the received motion vectors v(t) to v(t−4) whether the input pixels x(t−1) to x(t−4) are pixels belonging to still portions, and send the results of determination to the continuously-still-pixel-position detecting section 47.

The continuously-still-pixel-position detecting section 47 detects the still position of the aimed-at input pixel x(t) in the continuous frames (in this case, five frames from the (t−4)-th frame to the t-th frame) according to the results of still-pixel determination executed by the still-pixel determination sections 42 to 46. The result of detection is sent to the memory controller 48.

The memory controller 48 determines in a step S22 according to the output of the continuously-still-pixel-position detecting section 47 whether the position of the aimed-at input pixel x(t) belongs to a still portion in the continuous frames. When the memory controller 48 determines in the step S22 that the position of the aimed-at input pixel x(t) does not belong to a still portion in the continuous frames, in other words, when any of the input pixels x(t−1) to x(t−4) disposed at the same position as the aimed-at input pixel x(t) has motion, the memory controller 48 instructs the variance accumulation memory 40 to discard the variance sent from the variance calculation section 39, and the processing skips a step S23 and proceeds to a step S24. Therefore, in this case, the variance accumulation memory 40 discards the variance sent from the variance calculation section 39, that is, the variance obtained from a pixel having motion, without accumulating it.

When the memory controller 48 determines in the step S22 that the position of the aimed-at input pixel x(t) belongs to a still portion in the continuous frames, in other words, when any of the input pixels x(t−1) to x(t−4) disposed at the same position as the aimed-at input pixel x(t) does not have motion, the processing proceeds to the step S23 and the memory controller 48 instructs the variance accumulation memory 40 to accumulate the variance sent from the variance calculation section 39. Then, the processing proceeds to the step S24. Therefore, in this case, the variance accumulation memory 40 accumulates the variance sent from the variance calculation section 39, that is, adds the variance obtained from this still pixel to the already accumulated variance value, and stores the accumulated value.

In the step S24, the controller (not shown) determines whether all the input pixels constituting the aimed-at frames have been set to aimed-at input pixels and processed. When it is determined that all the input pixels have not yet been set, the processing returns to the step S21, an input pixel which constitutes the aimed-at frame but has not yet been set to an aimed-at input pixel is set to a new aimed-at input pixel, and the processes of the step S21 and the subsequent steps are repeated.

When the controller (not shown) determines in the step S24 that all the input pixels constituting the aimed-at frame have been set to aimed-at input pixels and processed, the processing proceeds to a step 25, and the frame-average-variance calculation section 41 obtains the amount of noise included in each input pixel constituting the aimed-at frame.

More specifically, when all the input pixels of the aimed-at frame have been processed, the memory controller 48 receives a frame reset signal. When the memory controller 48 receives the frame reset signal, the memory controller 48 instructs the frame-average-variance calculation section 41 to calculate the average of the accumulated variance value stored in the variance accumulation memory 40, and resets the stored value of the variance accumulation memory 40 to zero.

The frame-average-variance calculation section 41 calculates the average of the accumulated variance value of one frame, stored in the variance accumulation memory 40 under the control of the memory controller 48. The variance accumulation memory 40 accumulates only the variances obtained from still pixels, as described above, and stores the accumulated variance value. Therefore, the frame-average-variance calculation section 41 calculates the average of the variances obtained from such still pixels (pixels which are continuously still in five frames). The average is output as the amount N(t) of noise included in the input pixels constituting the aimed-at frame (the t-th frame).

Then, the processing proceeds to a step S26, and the controller (not shown) determines whether the input pixels of the next frame and their motion vectors are found. When it is determined that they are found, the processing returns to the step S21, the frame is set to a new aimed-at frame, and the same processes as those described above are repeated.

When the controller determines in the step S26 that the input pixels of the next frame or their motion vectors are not found, the noise-amount estimate processing is terminated.

As described above, the noise-amount estimate section 2 detects five pixels which continue being still in five frames from the aimed-at frame to the frame four frames before and which are disposed at the identical position, and uses the average of the variance of the five pixels as an estimated amount of noise included the input pixels of the aimed-at frame. Therefore, in this case, since a pixel having motion is not used to estimate the amount of noise, the motion of the image is prevented from affecting the estimated amount of noise. In other words, the amount of noise (amount of noise close to the true amount of noise) which is hardly affected by the motion of the image is estimated.

In the above-described case, variance is obtained from five pixels which continue being still from the aimed-at frame to the frame four frames before and which are disposed at the identical position. Pixels with which variance is to be obtained are not limited to five pixels.

Figure 9:
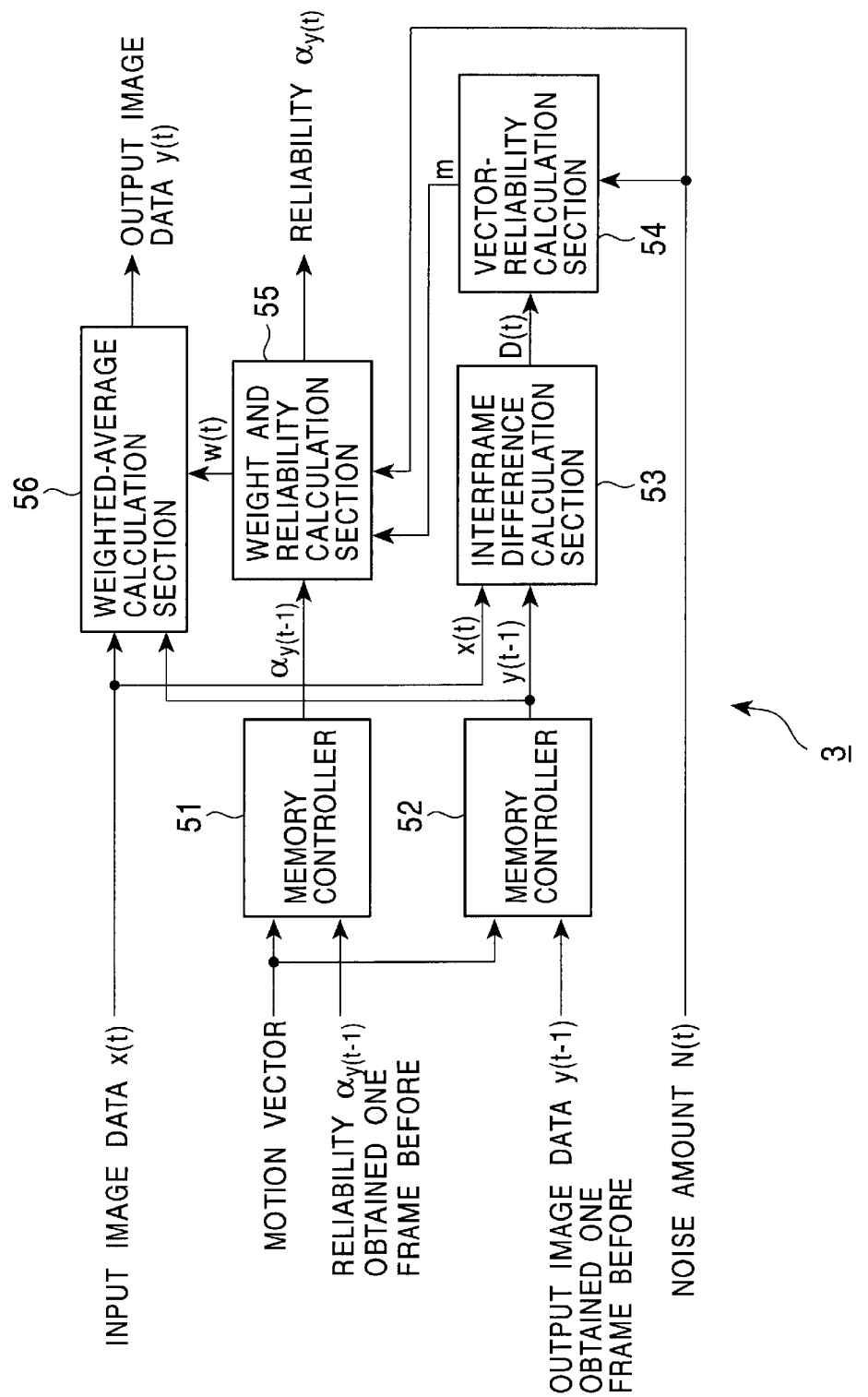
FIG. 9 is a block diagram of a noise reduction section 3 shown in FIG. 2.

FIG. 9 shows an example structure of the noise reduction section 3 shown in FIG. 2. The noise reduction section 3 executes noise reduction processing for removing noise from an input pixel x(t).

More specifically, memory controllers 51 and 52 receive the motion vector v(t) of the input pixel x(t), detected by the ME section 1. The memory controllers 51 and 52 specify the reading addresses of the memory 4 and the memory 5 according to the motion vector v(t), and read the output reliability $\alpha_{y(t-1)}$ of the output pixel y(t−1) obtained one frame before and the output pixel y(t−1) from the memory 4 and the memory 5, respectively. The memory controller 51 sends the output reliability $\alpha_{y(t-1)}$ read from the memory 4 to a weight and reliability calculation section 55, and the memory controller 52 sends the output pixel y(t−1) read from the memory 5 to an interframe difference calculation section 53 and to a weighted-average calculation section 56.

The interframe difference calculation section 53 receives the output pixel y(t−1) sent from the memory controller 52 as described above, and the input pixel x(t). The interframe difference calculation section 53 calculates the absolute value of the difference between the input pixel x(t) and the output pixel y(t−1) corresponding thereto and obtained one frame before, namely, the residual D(t) of the motion vector v(t) detected for the input pixel x(t), and sends it to a vector-reliability calculation section 54.

The vector-reliability calculation section 54 receives the residual D(t) from the interframe difference calculation section 53 as described above, and the amount N(t) of noise of the input pixel x(t), sent from the noise-amount estimate section 2. The vector-reliability calculation section 54 uses the residual D(t) and the amount N(t) of noise to calculate the vector reliability "m" indicating the reliability of the motion vector v(t) according to the expression (15), and sends it to the weight and reliability calculation section 55.

The weight and reliability calculation section 55 receives the output reliability $\alpha_{y(t-1)}$ from the memory controller 51 and the vector reliability "m" from the vector-reliability calculation section 54 as described above, and the amount N(t) of noise of the input pixel x(t), sent from the noise-amount estimate section 2. The weight and reliability calculation section 55 obtains the input reliability $\alpha_{x(t)}$ of the input pixel x(t) according to the amount N(t) of noise, and uses the input reliability $\alpha_{x(t)}$, the output reliability $\alpha_{y(t-1)}$ sent from the memory controller 51, and the vector reliability "m" sent from the vector-reliability calculation section 54 to obtain the output reliability $\alpha_{y(t)}$ of the output pixel y(t) corresponding to the input pixel x(t) and the weight w(t) used to obtain the output pixel y(t) according to the expressions (13) and (14). The output reliability $\alpha_{y(t)}$ obtained by the weight and reliability calculation section 55 is sent to the memory 4 and stored therein, and the weight w(t) is sent to the weighted-average calculation section 56.

The weighted-average calculation section 56 uses the input pixel x(t), the output pixel y(t−1), and the weight w(t)

all received to calculate the weighted average (weighted sum) according to the expression (8), and outputs the obtained value as the output pixel y(t) (output pixel y(t) corresponding to the input pixel x(t)) obtained by removing noise from the input pixel x(t).

Figure 10:
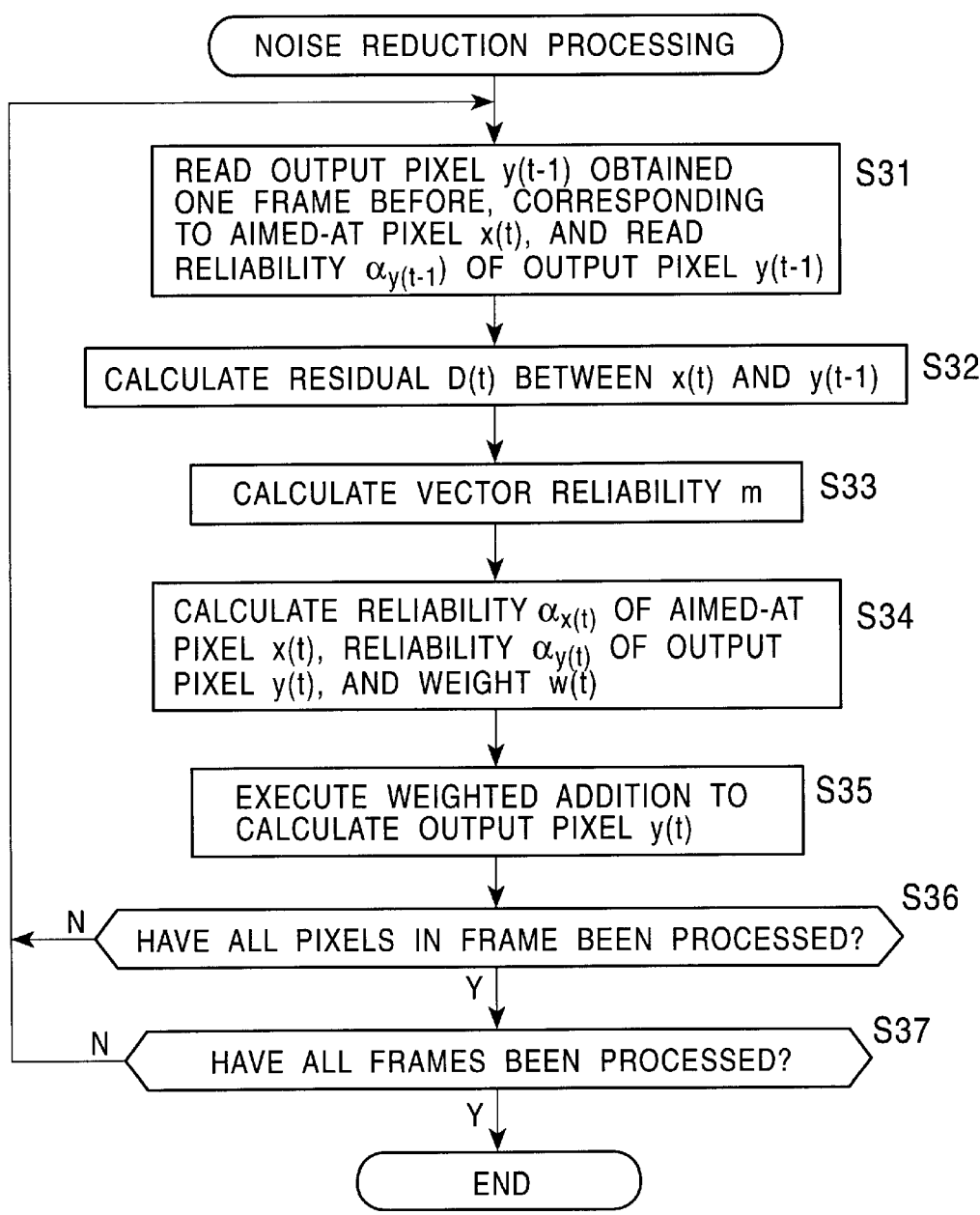
FIG. 10 is a flowchart of processing executed by the noise reduction section 3 shown in FIG. 9.

The noise reduction processing executed by the noise reduction section 3 shown in FIG. 3 will be described next by referring to a flowchart shown in FIG. 10.

The aimed-at input pixel x(t), which is the input pixel x(t) to be processed, is input to the interframe difference calculation section 53 and to the weighted-average calculation section 56. At the same time, in a step S31, the output pixel y(t−1) obtained one frame before, corresponding to the aimed-at input pixel x(t) is sent to the interframe difference calculation section 53 and to the weighted-average calculation section 56, and its output reliability $\alpha_{y(t-1)}$ is sent to the weight and reliability calculation section 55.

More specifically, the aimed-at input pixel x(t) is sent to the interframe difference calculation section 53 and to the weighted-average calculation section 56, and at the same time, the motion vector v(t) of the aimed-at input pixel x(t) is sent to the memory controllers 51 and 52.

The memory controller 51 calculates the address where the output reliability $\alpha_{y(t-1)}$ of the output pixel y(t−1) obtained one frame before, corresponding to the aimed-at input pixel x(t) is stored in the memory 4, according to the motion vector v(t), reads the output reliability $\alpha_{y(t-1)}$ at the address, and sends it to the weight and reliability calculation section 55. The memory controller 52 calculates the address where the output pixel y(t−1) obtained one frame before, corresponding to the aimed-at input pixel x(t) is stored in the memory 5, according to the motion vector v(t), reads the output pixel y(t−1) at the address, and sends it to the interframe difference calculation section 53 and to the weighted-average calculation section 56.

The processing proceeds to a step S32. The interframe difference calculation section 53 calculates the difference between the output pixel y(t−1) sent from the memory controller 52 and the input pixel x(t), namely, the residual D(t) of the motion vector v(t) detected for the aimed-at input pixel x(t). The residual D(t) is sent to the vector-reliability calculation section 54.

The vector-reliability calculation section 54 receives the amount N(t) of noise from the noise-amount estimate section 2 when processing for the frame (aimed-at frame) which includes the aimed-at input pixel x(t) starts. The vector-reliability calculation section 54 uses the residual D(t) and the amount N(t) of noise to calculate the vector reliability "m" indicating the reliability of the motion vector v(t) according to the expression (15). The vector reliability "m" is sent to the weight and reliability calculation section 55, and the processing proceeds to a step S34.

In the step S34, the weight and reliability calculation section 55 calculates the input reliability $\alpha_{x(t)}$ of the aimed-at input pixel x(t), and further obtains the output reliability $\alpha_{y(t)}$ of the output pixel y(t) corresponding to the input pixel x(t), and the weight w(t) used to obtain the output pixel y(t).

More specifically, the weight and reliability calculation section 55 uses the amount N(t) of noise to obtain the input reliability $\alpha_{x(t)}$ of the aimed-at input pixel x(t) according to the following expression.

$$\alpha_{x(t)} = 1/N(t) \tag{16}$$

Since N(t) indicates the amount of noise (amount of noise close to the true amount of noise) which is hardly affected by image motion as described above, the degree of the input reliability precisely indicating the reliability of the aimed-at input pixel x(t) is obtained by defining the input reliability $\alpha_{x(t)}$ with the amount of noise as shown in the expression (16). The amount N(t) of noise is the average of the variance of the five pixels which continue being still from the aimed-at frame to the frame four frames before and which are disposed at the identical position, as described above. Therefore, only one amount of noise is obtained in the aimed-at frame. As a result, since the input reliability $\alpha_{x(t)}$ is obtained from the amount N(t) of noise, only one input reliability is obtained in the aimed-at frame. In other words, the input reliability $\alpha_{x(t)}$ is obtained in a condition in which each input pixel includes the amount N(t) of noise in the aimed-at frame.

The weight and reliability calculation section 55 uses the input reliability $\alpha_{x(t)}$ calculated by the expression (16), the output reliability $\alpha_{y(t-1)}$ sent from the memory controller 51, and the vector reliability "m" sent from the vector-reliability calculation section 54 to obtain the output reliability $\alpha_{y(t)}$ of the output pixel y(t) corresponding to the input pixel x(t), and the weight w(t) used to obtain the output pixel y(t), according to the expressions (13) and (14). The output reliability $\alpha_{y(t)}$ is sent to the memory 4 and stored therein, and the weight w(t) is sent to the weighted-average calculation section 56.

In a step S35, the weighted-average calculation section 56 uses the aimed-at input pixel x(t), the output pixel y(t−1) sent from the memory controller 52, and the weight w(t) sent from the weight and reliability calculation section 55 to calculate the weighted average according to the expression (8). More specifically, the weighted-average calculation section 56 calculates the weighted sum of the aimed-at input pixel x(t) and the output pixel y(t−1) obtained one frame before, corresponding to the aimed-at input pixel x(t) with (1−w(t)) and w(t) being used as weights, and outputs the sum as the output pixel y(t) obtained by removing noise from the input pixel x(t). The output pixel y(t) is sent to the memory 5 and stored therein.

Then, the processing proceeds to a step S36, and the controller (not shown) determines whether all the pixels of the aimed-at frame have been processed. When it is determined that all the pixels have not yet been processed, the processing returns to the step S31, an input pixel of the aimed-at frame, which has not yet been set to an aimed-at input pixel is set to a new aimed-at input pixel, and the processes of the step S31 and the subsequent steps are repeated.

When the controller determines in the step S36 that all the pixels of the aimed-at frame have been processed, the processing proceeds to a step S37, and it is determined whether a frame to be processed next is found. When it is determined in the step S37 that a frame to be processed next is found, the processing returns to the step S31 and the frame to be processed next is set to a new aimed-at frame, and the same processes as those described above are repeated.

When the controller determines in the step S36 that a frame to be processed next is not found, the noise reduction processing is terminated.

As described above, the amount of noise included in the input pixel x(t) is estimated by using only pixels belonging to still portions, the input reliability $\alpha_{x(t)}$ is obtained from the amount of noise, the vector reliability "m" of the motion vector v(t) is obtained, and the output reliability $\alpha_{y(t-1)}$ is compensated for with the vector reliability "m" being used as a compensation term. Therefore, noise is more effectively removed from a moving image.

In the above-described case, the output reliability is compensated for by the vector reliability "m." In addition, the input reliability can also be compensated for.

More specifically, in the above-described case, the noise-amount estimate section 2 calculates the average of the variances of input pixels which are continuously still in the time-axis direction, and sets the reciprocal thereof in the input reliability $\alpha_{x(t)}$ of the input pixel x(t). In this case, the average of the still input pixels is set to the tree value. This average, however, does not necessarily match the true value of the input pixel. Therefore, it is ideal that the input reliability $\alpha_{x(t)}$ representing the reliability indicating that the input pixel x(t) has the true value be expressed, for example, by a value directly reflecting the error of the input pixel x(t) against its true value X as shown in an expression (17). (In the expression (17), the input reliability $\alpha_{x(t)}$ is set to the reciprocal of the square error of the input pixel x(t) against the true value X, and this is the reciprocal of the square power of noise included in the input pixel x(t).)

$$\alpha_{x(t)}=1/(x(t)-X)^2 \qquad (17)$$

Since the true value X of the input pixel x(t) is unknown in the expression (17), the input reliability $\alpha_{x(t)}$ needs to be obtained without using the true value X. Therefore, in the above-described case, the input reliability $\alpha_{x(t)}$ is obtained by assuming that the average of the still input pixels is the true value of the input pixel x(t).

Consequently, if the average of the still input pixels is shifted from the true value of the input pixel x(t), the reliability of the input pixel x(t), expressed by the input reliability $\alpha_{x(t)}$, is not reliable by that shift.

More specifically, when the average of still input pixels is used as a tentative true value X', and the reciprocal of the square error of the input pixel x(t) against the tentative true value X' is used as the input reliability $\alpha_{x(t)}$, the input reliability is indicated by the following expression.

$$\alpha_{x(t)}=1/(\Delta_{x(t)})^2=1/(x(t)-X')^2 \qquad (18)$$

Figure 11:
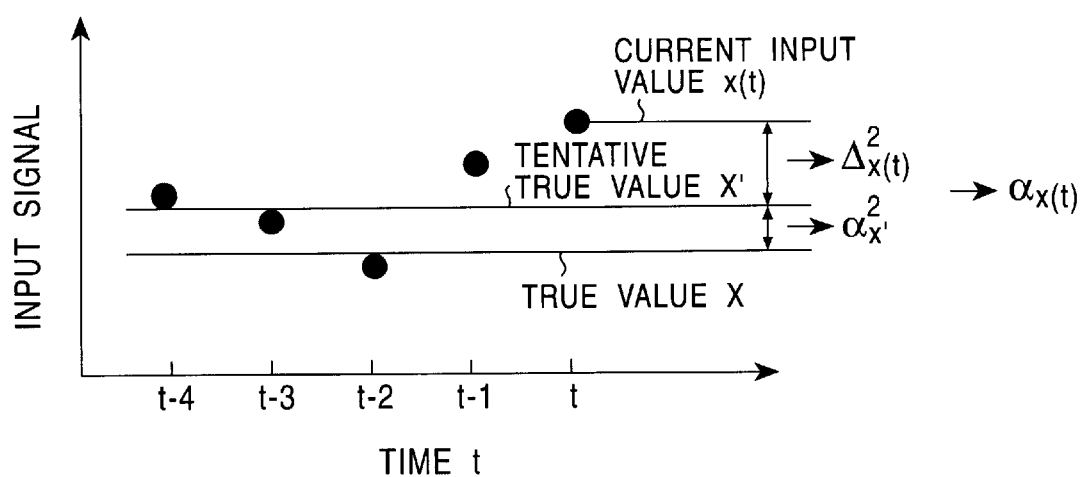
FIG. 11 is a view showing the relationship between a tentative true value X' and the true value X.

Since $(\Delta_{x(t)})^2$ in the expression (18) is the square error $((x(t)-X')^2)$ of the input pixel x(t) against the tentative true value X', noise included in the input pixel x(t) is almost estimated. However, this square error $(\Delta_{x(t)})^2$ does not include the error of the tentative true value X' against the true value. Therefore, this square error is basically different from the square error $((x(t)-X)^2)$ of the input pixel x(t) against the true value X, as shown in FIG. 11.

Reliability indicating that the square error $(\Delta_{(t)})^2$ of the input pixel x(t) against the tentative true value X' equals the square error $((x(t)-X)^2)$ of the input pixel x(t) against the true value X, namely, tentative-true-value reliability indicating that the tentative true value X' is equal to the true value X, is introduced as a compensation term (compensation value) $(\sigma_{X'})^2$ used for compensating for the input reliability $\alpha_{x(t)}$. The input reliability $\alpha_{x(t)}$, indicated by the reciprocal of the square error $(\Delta_{x(t)})^2$ of the input pixel x(t) against the tentative true value X', is compensated for to obtain more reliable input reliability $\alpha_{x(t)}$ (input reliability $\alpha_{x(t)}$ more reliably representing reliability indicating that the input pixel x(t) is the true value.)

It is assumed, for example, that, as the tentative true value X', the average (moving average) of N past input pixels x(t) to x(t−(N−1)), including the input pixel x(t), shown in an expression (19) is used.

$$X' = \bar{x} = \frac{\sum_{n=0}^{N-1} x(t-n)}{N} \qquad (19)$$

In the expression (19), x with a bar placed thereon indicates the average of the input pixels x(t) to x(t−(N−1)). In the present specification, x with a bar placed thereon is shown by x̌.

In this case, as a compensation term $(\sigma_{X'})^2$, the average $(\sigma_{\check{x}})^2$ of the variance of N past input pixels x(t) to x(t−(N−1)), including the input pixel x(t), can be used, as shown in the following expression.

$$\sigma_{\check{x}'}^2 = \sigma_{\check{x}}^2 = \frac{\sum_{n=0}^{N-1}(x(t-n)-\check{x})^2}{N(N-1)} \qquad (20)$$

The value obtained by dividing the numerator of the right-hand side in the expression (20) by (N−1) is the variance of the input pixels x(t) to x(t−(N−1)). In the expression (20), this value is divided by N to obtain the average $(\sigma_x)^2$ of the variance of N past input pixels x(t) to x(t−(N−1)). The average $(\sigma_x)^2$ obtained by the expression (20) is called "the variance of the average" in statistics. Since the variance is divided by N, it is more easily understood in meaning if it is called "the average of the variance." Therefore, it is called "the average of the variance" in the present specification.

In this case, for example, the input reliability $\alpha_{x(t)}$ is compensated for according to the following expression.

$$\alpha_{x(t)}=1/((\Delta_{x(t)})^2+(\sigma_{X'})^2) \qquad (21)$$

In the expression (21), the square error $(\Delta_{x(t)})^2$ (the reciprocal of the input reliability before compensation) of the input pixel x(t) against the tentative true value X' is compensated for by the compensation term $(\sigma_{X'})^2$, and the reciprocal thereof is obtained as the input reliability $\alpha_{x(t)}$ compensated for. In other words, the reciprocal of the sum of the square error $(\Delta_{x(t)})^2$ and the compensation term $(\sigma_{X'})^2$ is obtained as the input reliability $\alpha_{x(t)}$ compensated for.

In statistics, since the square error $(\Delta_{x(t)})^2$ of the input pixel x(t) against the tentative true value X' is estimated smaller than the square error $((x(t)-X)^2)$ of the input pixel x(t) against the true value X in many cases, the reciprocal of the sum of the square error $(\Delta_{x(t)})^2$ and the compensation term $(\sigma_{X'})^2$ is used as the input reliability $\alpha_{x(t)}$, as shown in the expression (21). Then, this input reliability $\alpha_{x(t)}$ more accurately represents the reliability indicating that the input pixel x(t) is the true value.

In the expressions (17) to (21), the input reliability $\alpha_{x(t)}$ defined by the reciprocal of the square error of the input data x(t) against the tentative true value X' is compensated for. In the same way as for the above-described case, the input reliability $\alpha_{x(t)}$ shown in the expression (16) can also be compensated for by adding the compensation term $(\sigma_{X'})^2$ to the denominator N(t) of $\alpha_{x(t)}=1/N(t)$ to obtain a more reliable input reliability $\alpha_{x(t)}$.

The present invention can also be applied to a case in which noise is removed from image data, sound data, and other data items.

In the present embodiment, the foregoing description has been made for the present invention in terms of removing noise. In the present invention, as described above, since input data is processed such that output data is improved as time elapses, the present invention can also be applied to waveform shaping (waveform equalization) of input data.

The series of processing described above can be implemented by hardware or software. When the series of processing is achieved by software, a program constituting the software is installed into a computer which is built in the noise removing apparatus serving as special hardware or into a general-purpose computer.

Figure 12:
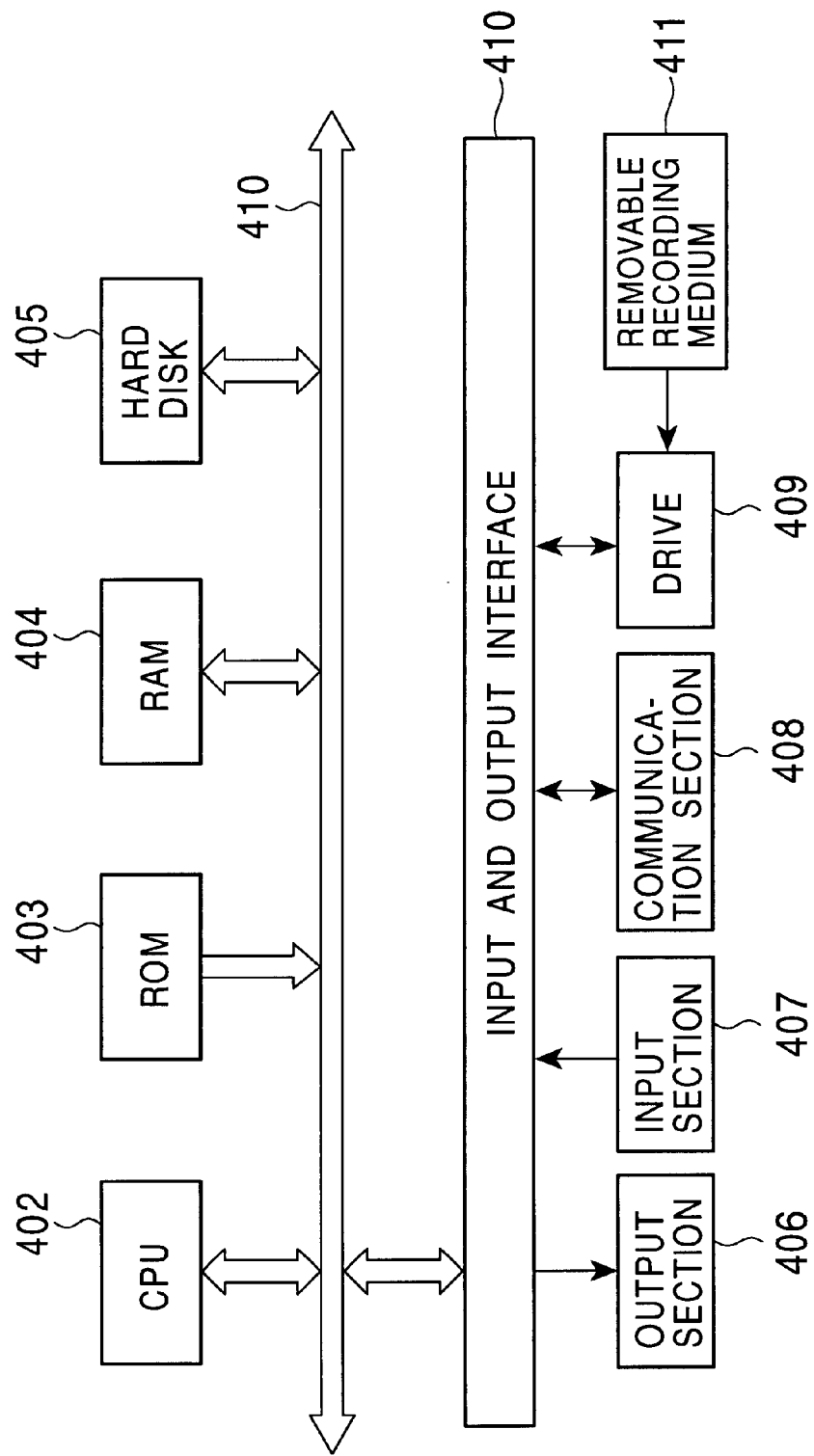
FIG. 12 is a block diagram of a computer according to another embodiment of the present invention.

FIG. 12 shows an example structure of a computer into which a program executing the above-described series of processing is installed.

The program can be recorded in advance into a hard disk 405 or a read-only memory (ROM) 403 serving as a recording medium which is built in a computer.

Alternatively, the program can be stored (recorded) temporarily or perpetually into a removable recording medium 411, such as a floppy disk, a compact disc read-only memory (CD-ROM), a magneto-optical (MO) disk, a digital versatile disk (DVD), a magnetic disk, or a semiconductor memory, driven by a suitable drive 409. Such a removable recording medium 411 can be offered as so-called package software.

The program can be installed into the computer from the above-described removable recording medium 411. Alternatively, the program can be transferred by radio from a downloading site to the computer through an artificial satellite for digital satellite broadcasting, or to the computer by wire through a network such as a local area network (LAN) or the Internet. The transferred program is received by a communication section 408 and installed into the built-in hard disk 405.

The computer includes a central processing unit (CPU) 402. The CPU 402 is connected to an input and output interface 410 through a bus 401. When the user operates an input section 407 formed of a keyboard, a mouse, and a microphone to input a command through the input and output interface 410, the CPU 402 executes the program stored in the ROM 403 according to the command. Alternatively, the CPU 402 loads into a random access memory (RAM) 404 the program stored in the hard disk 405; the program transferred through the satellite or the network, received by the communication section 408, and installed into the hard disk 405; or the program read from the removable recording medium 411 and installed into the hard disk 405; and executes it. With this operation, the CPU 402 executes the processing according to the flowcharts shown in FIG. 3, FIG. 6, FIG. 8, and FIG. 10. The CPU 402 then outputs the processing result, for example, through the input and output interface 410 to an output section 406 formed of a liquid-crystal display (LCD) and a speaker, transmits it from the communication section 408, or records it into the hard disk 405, as required.

In the present specification, the steps describing the programs for executing various types of processing in the computer are not necessarily processed in a time sequential manner in the order in which the steps are described in the flowcharts. Processing to be executed in parallel or individually, such as parallel processing or processing by objects, is also included.

The programs may be processed by only one computer, or may be distributed-processed by a plurality of computers. The programs may be transferred to a remote computer and executed.

According to an image processing apparatus and an image processing method of the present invention, the motion of each input pixel is determined, and the amount of noise included in an input pixel belonging to a still portion is estimated according to the result of determination. Then, according to the amount of noise, an input reliability indicating the reliability of the input pixel is calculated, and an output reliability indicating the reliability of an output pixel is also calculated. The input pixel is processed according to the input reliability and the output reliability to output the corresponding output pixel. Therefore, noise included in moving-image data is more effectively removed.

According to a data processing apparatus and a data processing method of the present invention, an input reliability indicating the reliability of input data is calculated, and an output reliability indicating the reliability of output data is also calculated. An output compensation term used to compensate for the output reliability is calculated. Then, the output reliability is compensated for according to the output compensation term. The input data is processed according to the input reliability and the output reliability compensated for to output the corresponding output data. Therefore, an output reliability more accurately representing reliability indicating that the output data is the true value is obtained. With the use of this output reliability, noise is more effectively removed.

What is claimed is:

1. An image processing apparatus for processing input pixel data and for outputting the processed input pixel data as output pixel data, comprising:

input reliability calculation means for calculating an input reliability indicating the reliability of the input pixel data;

output reliability calculation means for calculating an output reliability indicating the reliability of the output pixel data;

motion-amount detecting means for detecting a motion amount of the input pixel data;

motion-amount-reliability calculation means for calculating a motion-amount reliability indicating the reliability of the motion amount;

compensation means for compensating for the output reliability according to the motion-amount reliability; and processing means for processing the input pixel data according to the input reliability and the output reliability compensated for, and for outputting the output pixel data.

2. An image processing apparatus according to claim 1, wherein said motion-amount detecting means detects a motion vector corresponding to the input pixel data.

3. An image processing apparatus according to claim 2, wherein said motion-amount detecting means calculates differences of corresponding pixels between an image block formed of a predetermined number of pixels disposed around the input pixel data and including the image block, and another image block included in a preceding screen and having the same size as the image block, and searches for the position of the another image block in the preceding screen according to the differences to detect the motion vector.

4. An image processing apparatus according to claim 3, wherein said motion-amount detecting means expands the size of the image blocks when the difference between the minimum value of the sums of the differences of corresponding pixels between the image blocks and the next-minimum value thereof is equal to or smaller than a predetermined value, and detects the motion vector according to the position of the another image block in the preceding screen where the sum of the differences becomes minimum when the difference between the minimum value of the sums of the differences and the next-minimum value of the sums of the differences is larger than the predetermined value.

5. An image processing apparatus according to claim 3, wherein said motion-amount-reliability calculation means calculates the reliability of the motion vector according to the differences.

6. An image processing apparatus according to claim 4, wherein said motion-amount-reliability calculation means calculates the reliability of the motion vector according to the minimum sum of the differences.

7. An image processing apparatus according to claim 5, further comprising noise-amount estimate means for estimating the amount of noise included in the input pixel data, wherein said motion-amount-reliability calculation means calculates the motion-amount reliability according to the amount of noise.

8. An image processing apparatus according to claim 7, further comprising input-pixel-data storage means for storing a predetermined number of input pixel data disposed at a same position in screens that are input in time sequence, wherein said noise-amount estimate means estimates the amount of noise according to the variance of a stored input image data, and said motion-amount-reliability calculation means calculates the motion-amount reliability according the estimated amount of noise.

9. An image processing apparatus according to claim 8, wherein the noise-amount estimate means calculates the variance of the stored input pixel data to estimate the amount of noise when said motion-amount detecting means determines that the stored input pixel data is all still.

10. An image processing apparatus according to claim 9, wherein said noise-amount estimate means uses the average of the variances, obtained by averaging the variances calculated in a screen, as the estimated amount of noise in that screen.

11. An image processing apparatus according to claim 7, wherein said input reliability calculation means calculates the reciprocal of the estimated amount of noise as the input reliability.

12. An image processing apparatus according to claim 11, wherein said input reliability calculation means calculates the reciprocal of the sum of the estimated amount of noise and an average of the variances of the stored input pixel data, as the input reliability.

13. An image processing apparatus according to claim 12, further comprising output-pixel-data storage means for storing a predetermined number of the output pixel data output time-sequentially, wherein said output reliability calculation means calculates the reciprocal of the variance of the stored output pixel data as the output reliability.

14. An image processing apparatus according to claim 13, wherein said compensation means multiplies the output reliability by the motion-amount reliability to compensate for the output reliability.

15. An image processing apparatus according to claim 13, wherein said processing means comprises weight-coefficient calculation means for obtaining a predetermined weight coefficient according to the input reliability and the output reliability, and said processing means performs weighted addition of the input pixel data and the output pixel data in the preceding screen, corresponding to the input pixel data, with the weight coefficient to obtain the current output pixel data.

16. A data processing apparatus for processing input data and for outputting the processed input data as output data, comprising:

noise-amount estimate means for estimating the amount of noise included in the input data;

input reliability calculation means for calculating an input reliability indicating the reliability of the input data, according to the amount of noise;

output reliability calculation means for calculating an output reliability indicating the reliability of the output data;

compensation means for compensating for the output reliability according to the amount of noise; and processing means for processing the input data according to the input reliability and the output reliability compensated for, and for outputting the output data.

17. An image processing method for processing input pixel data and for outputting the processed input pixel data as output pixel data, comprising the steps of:

calculating an input reliability indicating the reliability of the input pixel data;

calculating an output reliability indicating the reliability of the output pixel data;

detecting a motion amount of the input pixel data;

calculating a motion-amount reliability indicating the reliability of the motion amount;

compensating for the output reliability according to the motion-amount reliability; and processing the input pixel data according to the input reliability and the output reliability compensated for, and for outputting the output pixel data.

18. A data processing method for processing input data and for outputting the processed input data as output data, comprising the steps of:

estimating the amount of noise included in the input data;

calculating an input reliability indicating the reliability of the input data, according to the amount of noise;

calculating an output reliability indicating the reliability of the output data;

compensating for the output reliability according to the amount of noise; and processing the input data according to the input reliability and the output reliability compensated for, and for outputting the output data.

19. A storage medium for storing a computer-controllable program for processing input pixel data and for outputting the processed input pixel data as output pixel data, the program comprising the steps of:

calculating an input reliability indicating the reliability of the input pixel data;

calculating an output reliability indicating the reliability of the output pixel data;

detecting a motion amount of the input pixel data;

calculating a motion-amount reliability indicating the reliability of the motion amount;

compensating for the output reliability according to the motion-amount reliability; and processing the input pixel data according to the input reliability and the output reliability compensated for, and for outputting the output pixel data.

20. A storage medium for storing a computer-controllable program for processing input data and for outputting the processed input data as output data, the program comprising the steps of:

estimating the amount of noise included in the input data;

calculating an input reliability indicating the reliability of the input data, according to the amount of noise;

calculating an output reliability indicating the reliability of the output data;

compensating for the output reliability according to the amount of noise; and processing the input data according to the input reliability and the output reliability compensated for, and for outputting the output data.

* * * * *